(12) United States Patent
Huang et al.

(10) Patent No.: US 12,232,200 B2
(45) Date of Patent: Feb. 18, 2025

(54) MULTI-LINK RECONFIGURATION METHOD AND APPARATUS

(71) Applicant: HUAWEI TECHNOLOGIES CO., LTD., Guangdong (CN)

(72) Inventors: Guogang Huang, Shenzhen (CN); Yuchen Guo, Shenzhen (CN); Yunbo Li, Shenzhen (CN); Ming Gan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/295,270

(22) Filed: Apr. 4, 2023

(65) Prior Publication Data

US 2023/0247703 A1   Aug. 3, 2023

Related U.S. Application Data

(63) Continuation of application No. PCT/CN2022/071673, filed on Jan. 12, 2022.

(30) Foreign Application Priority Data

| Jan. 15, 2021 | (CN) | 202110058021.9 |
| Jun. 25, 2021 | (CN) | 202110713587.0 |
| Jul. 9, 2021 | (CN) | 202110778961.5 |

(51) Int. Cl.
*H04W 4/00*   (2018.01)
*H04W 76/15*   (2018.01)

(52) U.S. Cl.
CPC .................. *H04W 76/15* (2018.02)

(58) Field of Classification Search
CPC .................... H04W 76/15; H04W 76/30
See application file for complete search history.

(56) References Cited

U.S. PATENT DOCUMENTS

| 2020/0163141 | A1* | 5/2020 | Hsu .................. H04W 52/0209 |
| 2021/0014776 | A1 | 1/2021 | Patil et al. |
| 2021/0055013 | A1 | 2/2021 | Rkert et al. |
| 2022/0124855 | A1* | 4/2022 | Hu ......................... H04W 76/25 |
| 2023/0156840 | A1* | 5/2023 | Chitrakar ............. H04B 17/309 |
| | | | 370/329 |

FOREIGN PATENT DOCUMENTS

| CN | 108064058 A | 5/2018 |
| CN | 110199494 A | 9/2019 |
| CN | 111066271 A | 4/2020 |
| CN | 111586667 A | 8/2020 |

(Continued)

OTHER PUBLICATIONS

IEEE 802.11-20/1554r2, Payam Torab et al, ML Reconfiguration, Dec. 2020, 26 pages.

(Continued)

*Primary Examiner* — Omoniyi Obayanju

(57) ABSTRACT

A multi-link reconfiguration method and apparatus relate to the field of communications technologies are provided to reconfigure a link between two MLDs. The method includes: A first MLD generates a first frame, where the first frame is used to reconfigure a link between the first MLD and a second MLD. The first MLD sends the first frame to the second MLD.

15 Claims, 21 Drawing Sheets

(56) References Cited

FOREIGN PATENT DOCUMENTS

| | | |
|---|---|---|
| CN | 112074020 A | 12/2020 |
| CN | 112188644 A | 1/2021 |
| CN | 113676298 A | 11/2021 |
| RU | 2707146 C1 | 11/2019 |
| WO | WO-2019040092 A1 * | 2/2019 |
| WO | 2021207463 A1 | 10/2021 |

OTHER PUBLICATIONS

IEEE 802.11-20/1554r3, Payam Torab et al, ML Reconfiguration, Dec. 2020, 26 pages.
IEEE P802.11, Wireless LANs, "Improvements to BSS Transition Management", Nov. 18, 2009, p. 1-20, Available at: 11-09-1298-05-000v-sb-bss-transition-comments.doc (live.com).
Payam Torab (Facebook): "ML Reconfiguration." IEEE 802.11-20/1554r3. Dec. 17, 2020. total 26 pages.

* cited by examiner

| Category | Wireless network management action | Dialog token | BSS transition query reason | BSS transition candidate list |
|---|---|---|---|---|

| Category | Wireless network management action | Dialog token | BTM status code | BSS termination delay | Target BSSID | BSS transition candidate list |
|---|---|---|---|---|---|---|

FIG. 13

| Preferred candidate list included | Abridge | Disassociation imminent | BSS termination included | Extended service set disassociation imminent | Link removal | Reserved |
|---|---|---|---|---|---|---|

FIG. 22

MULTI-LINK RECONFIGURATION METHOD AND APPARATUS

CROSS-REFERENCE TO RELATED APPLICATIONS

This application is a continuation of International Application No. PCT/CN2022/071673, filed on Jan. 12, 2022, which claims priority to Chinese Patent Application No. 202110058021.9, filed on Jan. 15, 2021 and Chinese Patent Application No. 202110713587.0, filed on Jun. 25, 2021 and Chinese Patent Application No. 202110778961.5, filed on Jul. 9, 2021. All of the afore-mentioned patent applications are hereby incorporated by reference in their entireties.

TECHNICAL FIELD

This application relates to the field of communication technologies, and in particular, to a multi-link reconfiguration method and apparatus.

BACKGROUND

To achieve technical goals of extremely high throughput, the Institute of Electrical and Electronics Engineers (IEEE) 802.11be standard includes multi-link (ML) communication as one of key technologies. A multi-link device (MLD) supporting ML communication is capable of sending and receiving over multiple links. In this way, the MLD can use a larger bandwidth for data transmission, to significantly improve a throughput rate. A link may refer to a spatial path on which an MLD performs data transmission on a frequency band.

Currently, one or more links may be established between two MLDs for communication through an association procedure. However, in some scenarios, the links established between two MLDs may not satisfy requirements for data transmission between the two MLDs. There is no solution to solve this problem in the industry.

SUMMARY

Embodiments of this application provide a multi-link reconfiguration method and apparatus to reconfigure a link between two MLDs.

According to a first aspect, a multi-link reconfiguration method is provided, including: A first MLD generates a first frame, where the first frame is used to reconfigure a link between the first MLD and a second MLD; and the first MLD sends the first frame to the second MLD. Based on the foregoing technical solution, by sending the first frame to the second MLD, the first MLD may trigger link reconfiguration between the first MLD and the second MLD, so as to satisfy requirements for data transmission between the first MLD and the second MLD.

Optionally, the first frame may be an action frame of a new type.

Optionally, the first frame may reuse an existing frame, for example, a reassociation request frame or a disassociation frame. It should be understood that, the first frame reuses the reassociation request frame or the disassociation frame, so that great changes to an existing protocol are avoided, an information element that should be included in the first frame does not need to be redefined, and a reserved value of a category field in the action frame is saved.

Optionally, in a case in which the first frame reuses the reassociation request frame, after the first MLD sends the first frame to the second MLD, the first MLD and the second MLD may continue to buffer the following information: an enhanced distributed channel access (EDCA) function state, a block acknowledgment agreement, a sequence number (SN), a packet number (PN), a duplicate detection cache, data queued for transmission, a fragment and reassembly buffer, a power management mode, and a wireless network management sleep mode. It should be understood that, different from the conventional technology in which a device needs to delete the foregoing information in a reassociation procedure, in this embodiment of this application, although the first frame reuses the reassociation request frame, the first MLD and the second MLD are not triggered to delete the foregoing information. Therefore, the first MLD and the second MLD do not need to renegotiate to obtain the foregoing information after changing link configuration, thereby reducing overheads caused by negotiation of the foregoing information.

In a possible design, that the first frame is used to reconfigure a link between the first MLD and a second MLD includes: the first frame indicates to establish a target link between the first MLD and the second MLD. It should be understood that data throughput between the first MLD and the second MLD may be increased by adding one or more links between them.

In a possible design, that the first frame is used to reconfigure a link between the first MLD and a second MLD includes: the first frame indicates to remove a target link from a link established between the first MLD and the second MLD. It should be understood that corresponding energy consumption may be reduced on the first MLD and the second MLD by removing one or more links between them.

In a possible design, that the first frame is used to reconfigure a link between the first MLD and a second MLD includes: the first frame indicates a target link, and the target link is used for data transmission between the first MLD and the second MLD.

In a possible design, the first frame includes a first field, the first field indicates a reconfiguration type, and the reconfiguration type includes link removal, link addition, or link transition. Based on this design, one type of first frame can implement a plurality of types of link reconfiguration.

In a possible design, the first frame may include a multi-link element, the multi-link element includes a per-link profile, and the per-link profile includes the first field.

In a possible design, that the first frame is used to reconfigure a link between the first MLD and a second MLD includes: when the first field indicates link removal, the first frame indicates to remove a target link from a link established between the first MLD and the second MLD; when the first field indicates link addition, the first frame indicates to establish a target link between the first MLD and the second MLD; or when the first field indicates link transition, the first frame indicates to switch a link established between the first MLD and the second MLD to a target link.

It should be understood that the link transition may enable the two MLDs to switch from a link with poor quality to a link with better quality for data transmission, which helps improve quality of service of data transmission between the two MLDs.

In a possible design, the first frame further includes a second field, and the second field indicates the target link.

In a possible design, the first frame may include the multi-link element, the multi-link element includes the per-link profile, and the per-link profile includes the second field.

In a possible design, the second field includes a bitmap, the bitmap includes at least one bit, and a bit in the bitmap indicates whether a link corresponding to the bit is the target link.

In a possible design, the second field includes an identifier of the target link.

In a possible design, the first frame further includes a third field, the third field indicates whether the first link is the target link, and the first link is a link used to communicate the first frame.

In a possible design, the first frame may include the multi-link element, and the multi-link element includes the third field.

In a possible design, the first frame is a re-association request frame or a disassociation frame, the first frame includes a multi-link element, the multi-link element includes a multi-link control field, and the multi-link control field includes a type field. The type field whose value is a first preset value indicates that the first frame is used to reconfigure the link between the first MLD and the second MLD, and the first preset value is not 0 or 1.

In a possible design, the method further includes: the first MLD receives a request frame from the second MLD, where the request frame is used to request link transition between the first MLD and the second MLD; and the first MLD sends a response frame to the second MLD, where the response frame indicates whether the link transition between the first MLD and the second MLD is accepted. Based on this design, before the link transition, the two MLDs negotiate the link transition, so that the two MLDs can determine a better link for transition. This ensures quality of data transmission between the two MLDs after the link transition.

In a possible design, the request frame further indicates a recommended link.

In a possible design, before the first MLD receives the request frame from the second MLD, the method further includes: the first MLD sends a query frame to the second MLD, where the query frame is used to negotiate link transition between the first MLD and the second MLD. Based on this design, the first MLD may send the query frame to trigger negotiation of link transition between the two MLDs.

According to a second aspect, a multi-link reconfiguration method is provided, including: A second MLD receives a first frame from a first MLD, where the first frame is used to reconfigure a link between the first MLD and the second MLD; and the second MLD parses the first frame.

In a possible design, that the first frame is used to reconfigure a link between the first MLD and the second MLD includes: the first frame indicates to establish a target link between the first MLD and the second MLD.

In a possible design, that the first frame is used to reconfigure a link between the first MLD and the second MLD includes: the first frame indicates to remove a target link from a link established between the first MLD and the second MLD.

In a possible design, that the first frame is used to reconfigure a link between the first MLD and the second MLD includes: the first frame indicates a target link, and the target link is used for data transmission between the first MLD and the second MLD.

In a possible design, the first frame includes a first field, the first field indicates a reconfiguration type, and the reconfiguration type includes link removal, link addition, or link transition.

In a possible design, that the first frame is used to reconfigure a link between the first MLD and the second MLD includes: when the first field indicates link removal, the first frame indicates to remove a target link from a link established between the first MLD and the second MLD; when the first field indicates link addition, the first frame indicates to establish a target link between the first MLD and the second MLD; or when the first field indicates link transition, the first frame indicates to switch a link established between the first MLD and the second MLD to a target link.

In a possible design, the first frame further includes a second field, and the second field indicates the target link.

In a possible design, the second field includes a bitmap, the bitmap includes at least one bit, and a bit in the bitmap indicates whether a link corresponding to the bit is the target link.

In a possible design, the second field includes an identifier of the target link.

In a possible design, the first frame further includes a third field, the third field indicates whether the first link is the target link, and the first link is a link used to communicate the first frame.

In a possible design, the first frame is a reassociation request frame or a disassociation frame; the first frame includes a multi-link element, the multi-link element includes a multi-link control field, and the multi-link control field includes a type field. The type field whose value is a first preset value indicates that the first frame is used to reconfigure the link between the first MLD and the second MLD, and the first preset value is not 0 or 1.

In a possible design, the method further includes: the second MLD sends a request frame to the first MLD, where the request frame is used to request link transition between the first MLD and the second MLD; and the second MLD receives a response frame from the first MLD, where the response frame indicates whether the link transition between the first MLD and the second MLD is accepted.

In a possible design, the request frame further indicates a recommended link.

In a possible design, before the second MLD sends the request frame to the first MLD, the method further includes: the second MLD receives a query frame from the first MLD, where the query frame is used to negotiate link transition between the first MLD and the second MLD.

According to a third aspect, an MLD is provided, including a processing module and a communication module. The processing module is configured to generate a first frame, where the first frame is used to reconfigure a link between a first MLD and a second MLD. The communication module is configured to send the first frame to the second MLD.

In a possible design, that the first frame is used to reconfigure a link between a first MLD and a second MLD includes: the first frame indicates to establish a target link between the first MLD and the second MLD.

In a possible design, that the first frame is used to reconfigure a link between a first MLD and a second MLD includes: the first frame indicates to remove a target link from a link established between the first MLD and the second MLD.

In a possible design, that the first frame is used to reconfigure a link between a first MLD and a second MLD includes: the first frame indicates a target link, and the target link is used for data transmission between the first MLD and the second MLD.

In a possible design, the first frame includes a first field, the first field indicates a reconfiguration type, and the reconfiguration type includes link removal, link addition, or link transition.

In a possible design, that the first frame is used to reconfigure a link between a first MLD and a second MLD includes: when the first field indicates link removal, the first frame indicates to remove a target link from a link established between the first MLD and the second MLD; when the first field indicates link addition, the first frame indicates to establish a target link between the first MLD and the second MLD; or when the first field indicates link transition, the first frame indicates to switch a link established between the first MLD and the second MLD to a target link.

In a possible design, the first frame further includes a second field, and the second field indicates the target link.

In a possible design, the second field includes a bitmap, the bitmap includes at least one bit, and a bit in the bitmap indicates whether a link corresponding to the bit is the target link.

In a possible design, the second field includes an identifier of the target link.

In a possible design, the first frame further includes a third field, the third field indicates whether the first link is the target link, and the first link is a link used to communicate the first frame.

In a possible design, the first frame is a reassociation request frame or a disassociation frame; the first frame includes a multi-link element, the multi-link element includes a multi-link control field, and the multi-link control field includes a type field. The type field whose value is a first preset value indicates that the first frame is used to reconfigure the link between the first MLD and the second MLD, and the first preset value is not 0 or 1.

In a possible design, the communication module is further configured to: receive a request frame from the second MLD, where the request frame is used to request link transition between the first MLD and the second MLD; and send a response frame to the second MLD, where the response frame indicates whether the link transition between the first MLD and the second MLD is accepted.

In a possible design, the request frame further indicates a recommended link.

In a possible design, the communication module is further configured to send a query frame to the second MLD, where the query frame is used to negotiate link transition between the first MLD and the second MLD.

According to a fourth aspect, an MLD is provided, including a processing module and a communication module. The communication module is configured to receive a first frame from a first MLD, where the first frame is used to reconfigure a link between the first MLD and a second MLD. The processing module is configured to parse the first frame.

In a possible design, that the first frame is used to reconfigure a link between the first MLD and a second MLD includes: the first frame indicates to establish a target link between the first MLD and the second MLD.

In a possible design, that the first frame is used to reconfigure a link between the first MLD and a second MLD includes: the first frame indicates to remove a target link from a link established between the first MLD and the second MLD.

In a possible design, that the first frame is used to reconfigure a link between the first MLD and a second MLD includes: the first frame indicates a target link, and the target link is used for data transmission between the first MLD and the second MLD.

In a possible design, the first frame includes a first field, the first field indicates a reconfiguration type, and the reconfiguration type includes link removal, link addition, or link transition.

In a possible design, that the first frame is used to reconfigure a link between the first MLD and a second MLD includes: when the first field indicates link removal, the first frame indicates to remove a target link from a link established between the first MLD and the second MLD; when the first field indicates link addition, the first frame indicates to establish a target link between the first MLD and the second MLD; or when the first field indicates link transition, the first frame indicates to switch a link established between the first MLD and the second MLD to a target link.

In a possible design, the first frame further includes a second field, and the second field indicates the target link.

In a possible design, the second field includes a bitmap, the bitmap includes at least one bit, and a bit in the bitmap indicates whether a link corresponding to the bit is the target link.

In a possible design, the second field includes an identifier of the target link.

In a possible design, the first frame further includes a third field, the third field indicates whether the first link is the target link, and the first link is a link used to communicate the first frame.

In a possible design, the first frame is a reassociation request frame or a disassociation frame; the first frame includes a multi-link element, the multi-link element includes a multi-link control field, and the multi-link control field includes a type field. The type field whose value is a first preset value indicates that the first frame is used to reconfigure the link between the first MLD and the second MLD, and the first preset value is not 0 or 1.

In a possible design, the communication module is further configured to: send a request frame to the first MLD, where the request frame is used to request link transition between the first MLD and the second MLD; and receive a response frame from the first MLD, where the response frame indicates whether the link transition between the first MLD and the second MLD is accepted.

In a possible design, the request frame further indicates a recommended link.

In a possible design, the communication module is further configured to receive a query frame from the first MLD, where the query frame is used to negotiate link transition between the first MLD and the second MLD.

According to a fifth aspect, an MLD is provided, including a processor and a transceiver. The processor is configured to perform a processing action in the corresponding method in the first aspect or the second aspect, and the transceiver is configured to perform a communication action in the corresponding method in the first aspect or the second aspect.

According to a sixth aspect, a computer-readable storage medium is provided. The computer-readable storage medium stores instructions, and when the instructions run on a computer, the computer is enabled to perform the method in any design of the first aspect or the second aspect.

According to a seventh aspect, a computer program product including instructions is provided. When the computer program product runs on a computer, the computer is enabled to perform the method in any design of the first aspect or the second aspect.

According to an eighth aspect, a chip is provided, including a processing circuit and a transceiver pin. The processing circuit is configured to perform a processing action in the corresponding method in the first aspect or the second aspect, and the transceiver pin is configured to perform a communication action in the corresponding method in the first aspect or the second aspect.

It may be understood that any MLD, chip, computer storage medium, or computer program product provided above is configured to perform the corresponding method provided above. Therefore, for beneficial effects that can be achieved by the MLD, chip, computer storage medium, or computer program product, refer to beneficial effects in the corresponding method provided above. Details are not described herein again.

BRIEF DESCRIPTION OF DRAWINGS

FIG. 13 is a schematic diagram of a frame structure of a BTM response frame in a related technology;

FIG. 22 is a schematic diagram of a frame structure of a request mode field according to an embodiment of this application.

DESCRIPTION OF EMBODIMENTS

Figure 1:
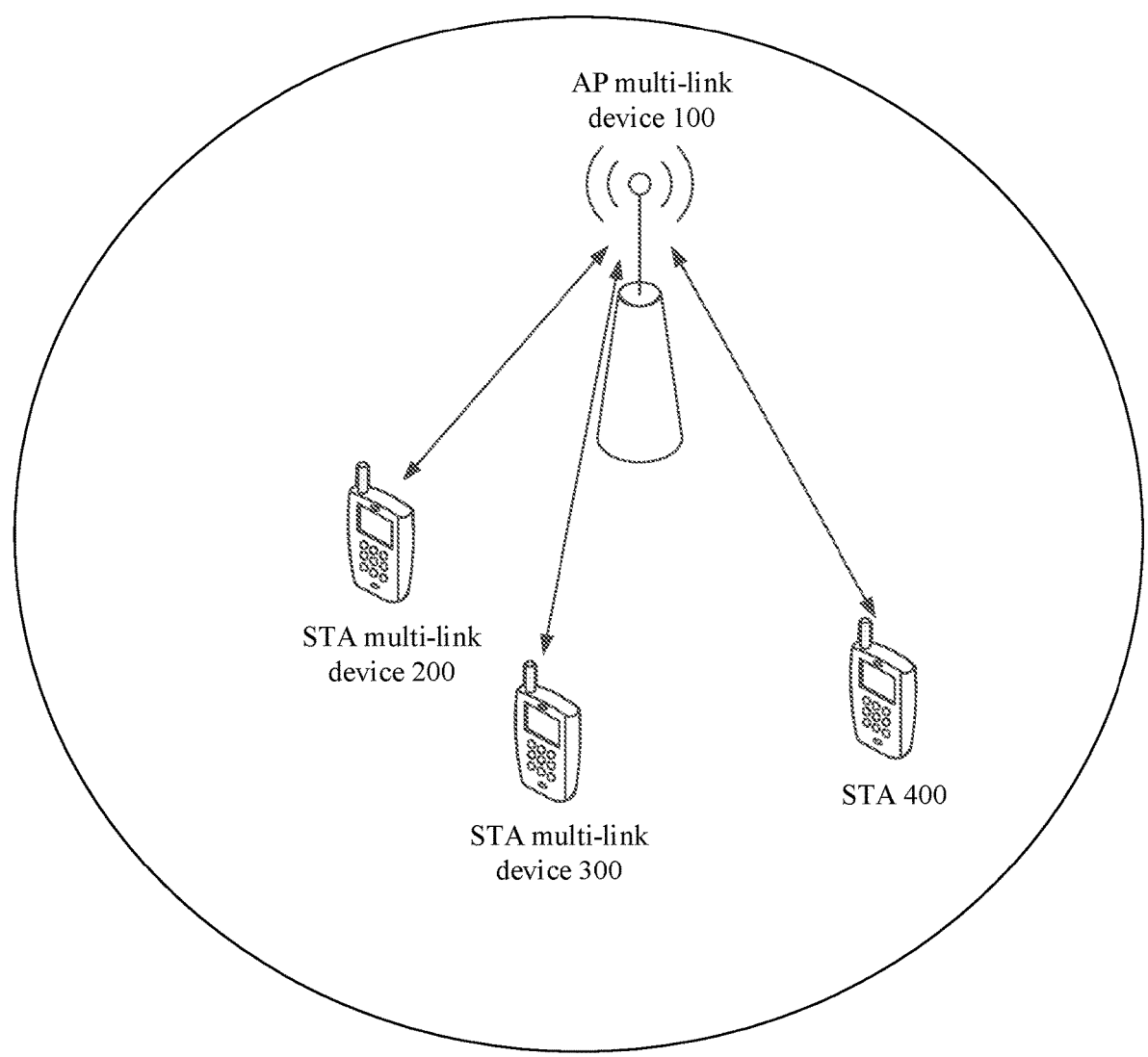
FIG. 1 is a schematic diagram of a scenario for communication between an AP multi-link device and a STA multi-link device according to an embodiment of this application.

In descriptions of this application, unless otherwise specified, "/" means "or". For example, A/B may represent A or B. A term "and/or" in this specification describes only an association relationship between associated objects and indicates that there may be three relationships. For example, A and/or B may represent the following three cases: Only A exists, both A and B exist, and only B exists. In addition, "at least one" means one or more, and "a plurality of" means two or more. Terms such as "first" and "second" do not limit a quantity and an execution sequence, and the terms such as "first" and "second" do not indicate a definite difference.

In this application, the word such as "example" or "for example" is used to represent giving an example, an illustration, or a description. Any embodiment or design scheme described as an "example" or "for example" in this application should not be explained as being more preferred or having more advantages than another embodiment or design scheme. Exactly, use of the word "for example" or "example" or the like is intended to present a relative concept in a specific manner.

The technical solutions provided in this application may be applied to various communication systems, for example, a system in which the IEEE 802.11 standard is applied. For example, the IEEE 802.11 standard includes but is not limited to the 802.11be standard or a next-generation 802.11 standard. The technical solutions of this application are applicable to the following scenarios: communication between an AP and a STA, communication between APs, communication between STAs, and the like.

STAs in this application may be various user terminals, user apparatuses, access apparatuses, subscriber stations, subscriber units, mobile stations, user agents, user devices, or other devices that have a wireless communication function. The user terminals may include various handheld devices, vehicle-mounted devices, wearable devices, computing devices that have the wireless communication function, or other processing devices connected to a wireless modem, and include various forms of user equipments (UEs), mobile stations (MSs), terminals, terminal devices, portable communication devices, handheld devices, portable computing devices, entertainment devices, game devices or systems, and global positioning system devices, or any other suitable device configured to perform network communication via wireless media. Herein, for ease of description, the devices mentioned above are collectively referred to as stations or STAs.

The access point AP in this application is an apparatus that is deployed in a wireless communication network and that provides a wireless communication function for a STA associated with the access point AP. The access point AP may be used as a hub of the communication system, and may be a communication device such as a base station, a router, a gateway, a repeater, a communication server, a switch, or a bridge. The base station may include a macro base station, a micro base station, a relay station, and the like in various forms. Herein, for ease of description, the devices mentioned above are collectively referred to as access points APs.

An IEEE 802.11 extremely high throughput (EHT) device, that is, a next-generation Wireless Fidelity (Wi-Fi) device supports multiple streams, multiple frequency bands (for example, 2.4 GHz, 5 GHz, and 6 GHz frequency bands), collaboration of multiple channels on a same frequency band, and the like to improve peak throughput and reduce service transmission delay. The multiple frequency bands or the multiple channels may be collectively referred to as multiple links.

A multi-link device includes one or more affiliated stations. The affiliated station may be a logical station or a physical station. In embodiments of this application, "a multi-link device includes an affiliated station" may be briefly described as "a multi-link device includes a station".

The affiliated station may be an access point (AP) or a non-access point station (non-AP STA). For ease of description, in embodiments of this application, a multi-link device of which the affiliated station is an AP may be referred to as a multi-link AP, an AP MLD, or a multi-link AP device, and a multi-link device of which the affiliated station is a STA may be referred to as a multi-link STA, a multi-link STA device, a STA MLD, or a non-AP MLD.

The multi-link device may implement wireless communication in compliance with the 802.11 protocol. For example, the 802.11 protocol may be the 802.11ax protocol, the 802.11be protocol, or a next-generation 802.11 protocol. This is not limited in embodiment of this application.

The multi-link device may communicate with another device. In embodiments of this application, the another device may be a multi-link device, or may not be a multi-link device.

For example, FIG. 1 is a schematic diagram of a scenario of communication between an AP multi-link device and STA multi-link devices. As shown in FIG. 1, one AP multi-link device may be associated with a plurality of STA multi-link devices and single-link STAs. For example, AP multi-link device 100 is associated with STA multi-link device 200, STA multi-link device 300, and STA 400. It should be understood that a plurality of APs in the AP multi-link device separately operate on multiple links, a plurality of STAs in the STA multi-link device separately operate on multiple links, and a STA in the STA multi-link device is associated with an AP in the AP multi-link device on an operating link of the STA. A single-link STA is associated with an AP in the AP multi-link device on an operating link of the single-link STA.

Figure 2A:
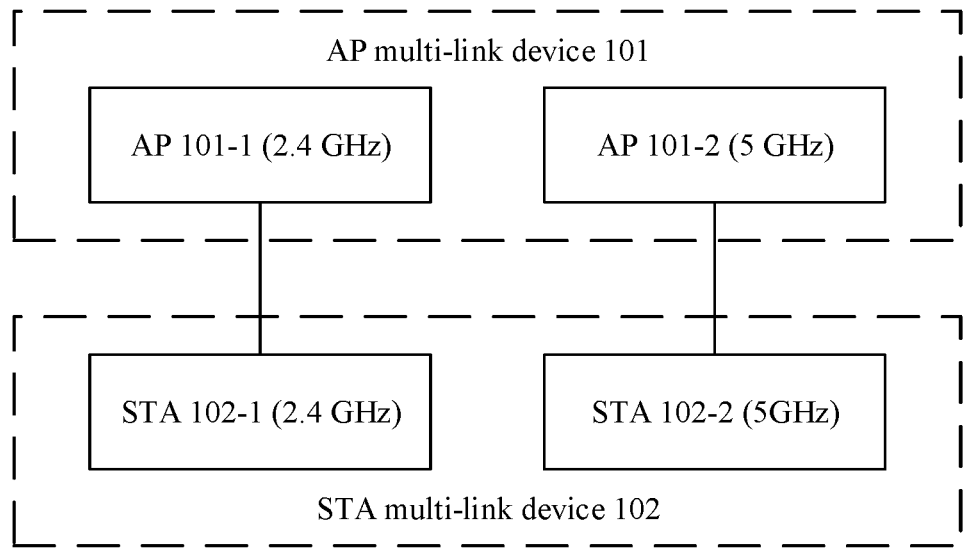
FIG. 2(a) and FIG. 2(b) are schematic diagrams of structures of an AP multi-link device and a STA multi-link device in communication.
Figure 2B:
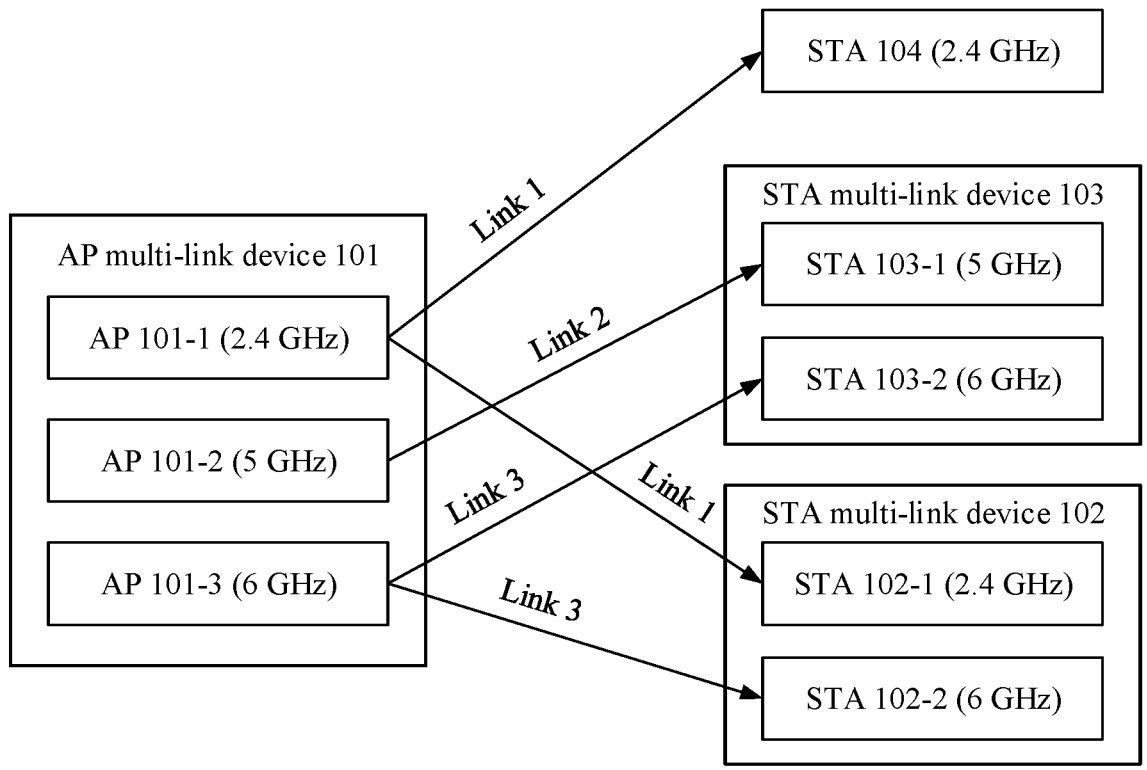

Frequency bands on which the multi-link device operates may include but are not limited to sub 1 GHz, 2.4 GHz, 5 GHz, 6 GHz, and high frequency 60 GHz. FIG. 2(a) and FIG. 2(b) show two schematic diagrams in which a multi-link device communicates with another device over multiple links in a wireless local area network.

FIG. 2(a) shows a scenario in which AP multi-link device 101 communicates with STA multi-link device 102. AP multi-link device 101 includes affiliated AP 101-1 and AP 101-2, STA device multi-link 102 includes affiliated STA 102-1 and STA 102-2, and AP multi-link device 101 and STA multi-link device 102 communicate with each other over both link 1 and link 2.

FIG. 2(b) shows a scenario in which AP multi-link device 101 communicates with STA multi-link device 102, STA multi-link device 103, and STA 104. AP multi-link device 101 includes affiliated AP 101-1 to AP 101-3, STA multi-link device 102 includes affiliated STA 102-1 and STA 102-2, and STA multi-link device 103 includes affiliated STA 103-1, STA 103-2. STA 104 is a single-link device (SLD). The AP multi-link device may communicate with STA multi-link device 102 over link 1 and link 3, communicate with STA multi-link device 103 over link 2 and link 3, and communicate with STA 104 over link 1. In an example, STA 104 operates in the 2.4 GHz frequency band; STA multi-link device 103 includes STA 103-1 and STA 103-2, where STA 103-1 operates in the 5 GHz frequency band and STA 103-2 operates in the 6 GHz frequency band; STA multi-link device 102 includes STA 102-1 and STA 102-2, where STA 102-1 operates in the 2.4 GHz frequency band and STA 102-2 operates in the 6 GHz frequency band. AP 101-1 operating in the 2.4 GHz frequency band in the AP multi-link device may exchange uplink or downlink data with STA 104 and STA 102-1 in the STA multi-link device 102 over link 1. AP 101-2 operating in the 5 GHz frequency band in the AP multi-link device may exchange uplink or downlink data with STA 103-1 operating in the 5 GHz frequency band in STA multi-link device 103 over link 2. AP 101-3 operating in the 6 GHz frequency band in AP multi-link device 101 may exchange uplink or downlink data with STA 102-2 operating in the 6 GHz frequency band in STA multi-link device 102 over link 3, and may also exchange uplink or downlink data with STA 103-2 in the STA multi-link device over link 3.

It should be noted that, FIG. 2(a) shows the AP multi-link device supporting only two frequency bands, and FIG. 2(b) uses an example in which the AP multi-link device supports only three frequency bands (2.4 GHz, 5 GHz, and 6 GHz), each frequency band corresponds to one link, and AP multi-link device 101 may operate on one or more of link 1, link 2, and link 3. On an AP side or a STA side, the link herein may also be understood as a station operating on the link. In an actual application, the AP multi-link device and the STA multi-link device may further support more or fewer frequency bands. In other words, the AP multi-link device and the STA multi-link device may operate on more links or fewer links. This is not limited in embodiments of this application.

For example, the multi-link device is an apparatus having a wireless communication function. The apparatus may be an entire device, or may be a chip, a processing system, or the like installed in the entire device. The device on which the chip or the processing system is installed may be controlled by the chip or the processing system, to implement the methods and functions in embodiments of this application.

The multi-link device may support simultaneous transmit and receive (STR) of data, or the multi-link device may not support simultaneous transmit and receive of data. Supporting simultaneous transmit and receive of data means that in a process in which the multi-link device sends data on one link, the multi-link device may receive data on another link. Not supporting simultaneous transmit and receive of data means that in a process in which the multi-link device sends data on one link, the multi-link device cannot receive data on another link.

For example, a non-AP MLD may perform a multi-link establishment operation on one of the links to simultaneously establish multiple links and establish association with the AP MLD. In the association process, the non-AP MLD and the AP MLD may exchange multi-link association request/response frames on one link. The link on which the multi-link association request/response frames are exchanged may be referred to as a transmitted link, and other links are referred to as non-transmitted links. It should be understood that the multi-link association request/response may carry information about multiple links to be established, to simultaneously establish multiple links between the non-AP MLD and the AP MLD.

For example, a non-AP MLD sends a multi-link association request frame on link 1, and the multi-link association request frame carries STA-side information about link 1 and STA-side information about link 2. It should be understood that the link 1 may be referred to as a transmitted link, and the link 2 may be referred to as a non-transmitted link. The AP MLD sends a multi-link association response frame to the non-AP MLD on link 1, and the multi-link association response frame may carry AP-side information about link 1 and AP-side information about link 2. Therefore, link 1 and link 2 are established between the non-AP MLD and the AP MLD. Further, the non-AP MLD and the AP MLD may perform data transmission on link 1 and link 2.

Figure 3:
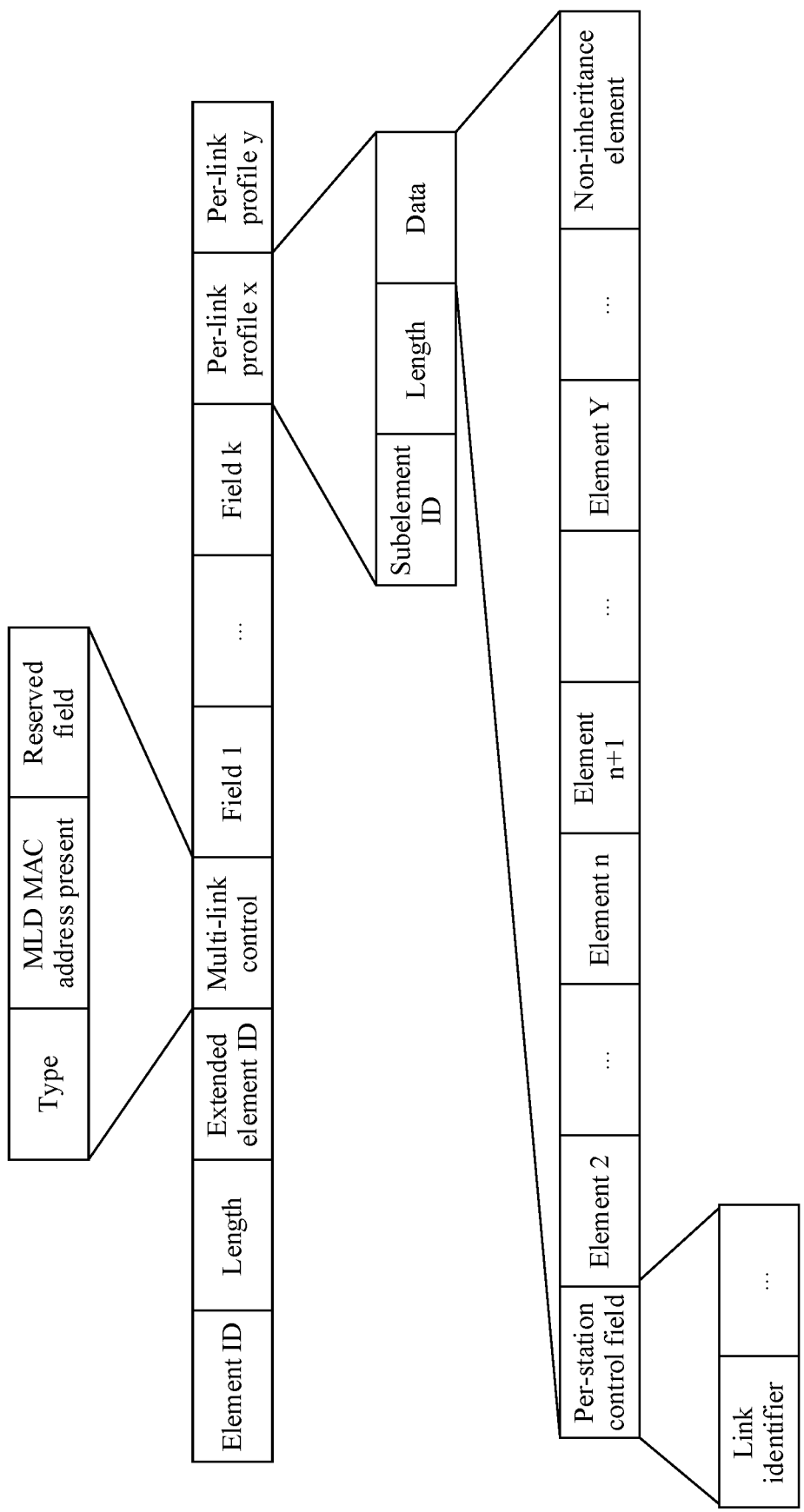
FIG. 3 is a schematic diagram of a frame structure of a multi-link element according to an embodiment of this application.

A multi-link element is defined in a protocol to carry information related to the non-AP MLD in an existing association request frame. For example, as shown in FIG. 3, information carried in the multi-link element is divided into two parts: MLD-level info and a per-link profile. The per-link profile may also be referred to as a per-STA profile. It should be understood that the per-link profile is optional. In other words, the multi-link element may not include the per-link profile, or may include one or more per-link profiles. For example, FIG. 3 shows a multi-link element having per-link profile x and per-link profile y.

MLD-level info includes the following fields: multi-link control (Multi-link control) and one or more fields. For example, the one or more fields may include the following fields: element ID, length, extended element ID, and the like.

The multi-link control field includes the following fields: type, MLD MAC address present, and reserved.

The per-link profile includes the following fields: subelement ID, length, and data.

The data field in the per-link profile includes one or more of the following fields: per-station control field, one or more elements, and a non-inheritance element. The non-inheritance element is an optional field.

The per-station control field includes at least a link ID. It should be understood that the non-AP MLD may obtain link information (for example, a link ID) corresponding to each link by receiving a probe response frame or a beacon frame.

In some scenarios, after two MLDs are associated, the established links may not satisfy requirement for data transmission between the two MLDs.

For example, only one link is established when the two MLDs are initially associated. However, there is a large amount of data to be transmitted between the two MLDs, and one link cannot meet throughput requirements of data transmission. Therefore, a link needs to be added between the two MLDs.

For another example, multiple links are established when the two MLDs are initially associated. However, the data to be transmitted between the two MLDs is relatively small, and one link can meet throughput requirements of data transmission. Therefore, a redundant link needs to be removed between the two MLDs to reduce energy consumption.

For another example, link 1 is established when the two MLDs are initially associated, but communication quality of link 1 is poor. Therefore, the two MLDs intend to transition from link 1 to link 2 for data transmission.

Currently, there is no solution provided in the industry for changing link configuration after MLD association.

Figure 4:
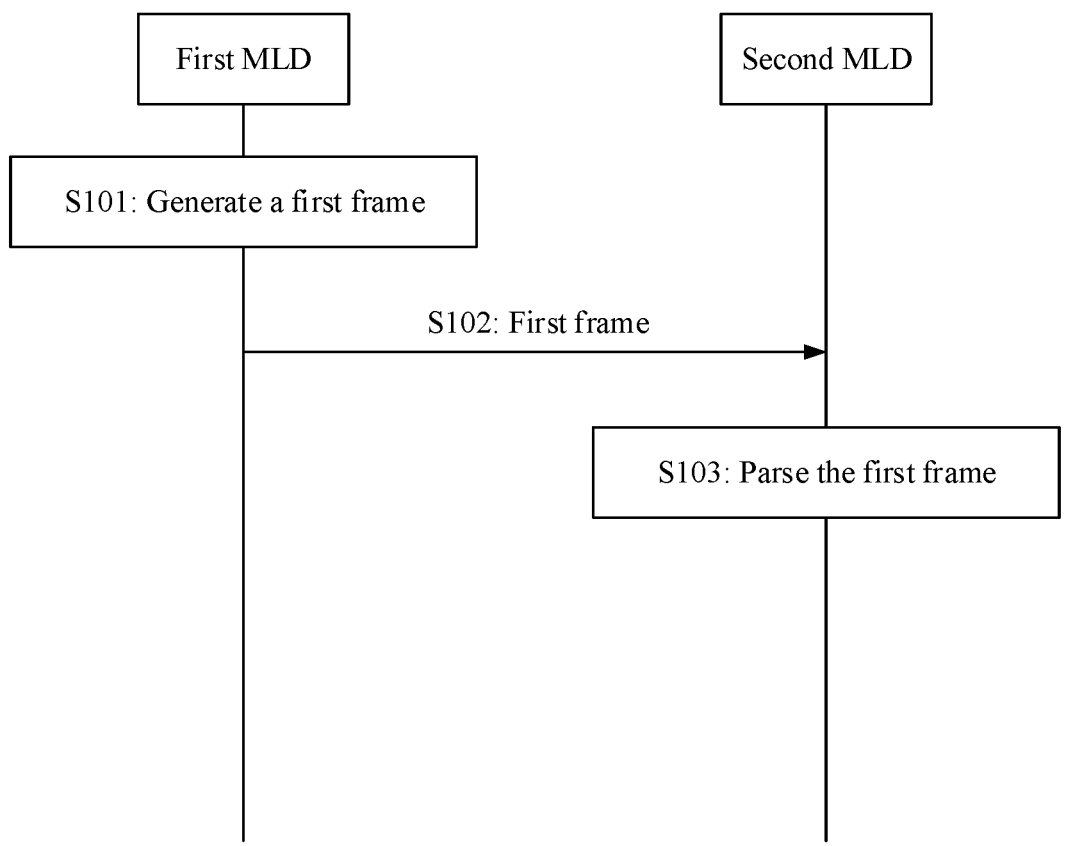
FIG. 4 is a flowchart of a multi-link reconfiguration method according to an embodiment of this application.

An embodiment of this application provides a multi-link reconfiguration method to support link configuration change after two MLDs are associated. As shown in FIG. 4, the method includes the following steps.

S101. A first MLD generates a first frame.

The first frame is used to reconfigure multiple links between the first MLD and the second MLD.

It should be understood that, before step S101, one or more links have been established between the first MLD and the second MLD through association.

In embodiments of this application, the first frame may be a newly defined frame, or reuse an existing frame (for example, a reassociation request frame or a disassociation frame). This is not limited.

Optionally, the first frame may use any one of the following designs.

Design 1-1: The first frame indicates to establish a target link.

Specifically, the first frame indicates to establish the target link between the first MLD and the second MLD. That is, the target link is a link that has not been established currently between the first MLD and the second MLD.

For example, link 1 and link 2 have been established between the first MLD and the second MLD through association. The first frame indicates to establish link 3, so that the link 3 may be further established between the first MLD and the second MLD. Then, link 1, link 2, and link 3 may be used for data transmission between the first MLD and the second MLD.

In this embodiment of this application, the two MLDs may perform data transmission on an established link, but cannot perform data transmission on an unestablished link. The two MLDs may exchange some management frames (such as association request/response frames) on an unestablished link for link establishment.

Design 1-2: The first frame indicates to remove a target link.

Specifically, the first frame indicates to remove the target link from a link established between the first MLD and the second MLD. The target link is a link currently established between the first MLD and the second MLD.

For example, link 1 and link 2 have been established between the first MLD and the second MLD through association. The first frame indicates to remove link 2. After the first MLD and the second MLD remove link 2, link 2 becomes an unestablished link between the first MLD and the second MLD. The first MLD and the second MLD can use only link 1 for data transmission, but cannot use link 2 for data transmission.

It should be understood that, based on design 1-1 and design 1-2, a function of the first frame may be associated with a type of the first frame. Therefore, the second MLD may determine the function of the first frame based on the type of the first frame. For example, the first frame in design 1-1 is a reassociation request frame. After receiving the reassociation request frame used for multi-link reconfiguration, the second MLD can determine that the reassociation request frame is used to establish the target link. Alternatively, the first frame in design 1-2 is a disassociation frame. After receiving the disassociation frame used for multi-link reconfiguration, the second MLD can determine that the disassociation frame is used to remove the target link.

Design 1-3: The first frame indicates a target link.

In other words, the first frame indicates the target link for data transmission between the first MLD and the second MLD.

The target link may be used for data transmission between the first MLD and the second MLD. The target link is a link supported between the first MLD and the second MLD. For example, the target link may be an unestablished link between the first MLD and the second MLD. Alternatively, the target link may also be a link currently established between the first MLD and the second MLD.

For example, link 1 and link 2 have been established between the first MLD and the second MLD through association. The first frame indicates link 2, link 3, and link 4, so that link 1 is removed and link 3 and link 4 are established between the first MLD and the second MLD. In this way, the first MLD and the second MLD may use link 2, link 3, and link 4 for data transmission, and cannot use link 1 for data transmission.

It should be understood that an idea of design 1-3 is as follows: The first frame indicates a link (that is, a target link) that should be finally established between the first MLD and the second MLD, so that the first MLD and the second MLD may determine a reconfiguration operation (for example, removing a link and/or adding a link) that should be actually performed based on a currently established link and the link that should be finally established.

Design 1-4: The first frame includes a first field, the first field indicates a reconfiguration type, and the reconfiguration type includes link removal, link addition, or link transition.

In embodiments of this application, link removal may also be referred to as link disconnection, and is used to configure a link that has been established between two devices as an unestablished link. Link addition may also be referred to as link creation, and is used to configure an unestablished link between two devices as an established link. Link transition may also be referred to as link switching, and is used to remove a link established between two devices and establish a link for transition.

Optionally, based on design 1-4, that the first frame is used to reconfigure multiple links between the first MLD and the second MLD includes the following cases.

Case 1: When the first field indicates link removal, the first frame indicates to remove a target link.

Case 2: When the first field indicates link addition, the first frame indicates to establish a target link.

Case 3: When the first field indicates link transition, the first frame indicates to switch the link established between the first MLD and the second MLD to a target link.

For example, link 1 and link 2 have been established between the first MLD and the second MLD through association. The first field included in the first frame indicates link transition, and the first field indicates to switch from link 2 established between the first MLD and the second MLD to link 3. In this way, link 2 is removed and link 3 is established between the first MLD and the second MLD. The first MLD and the second MLD may exchange data on link 1 and link 3, but not on link 2.

Figure 5:
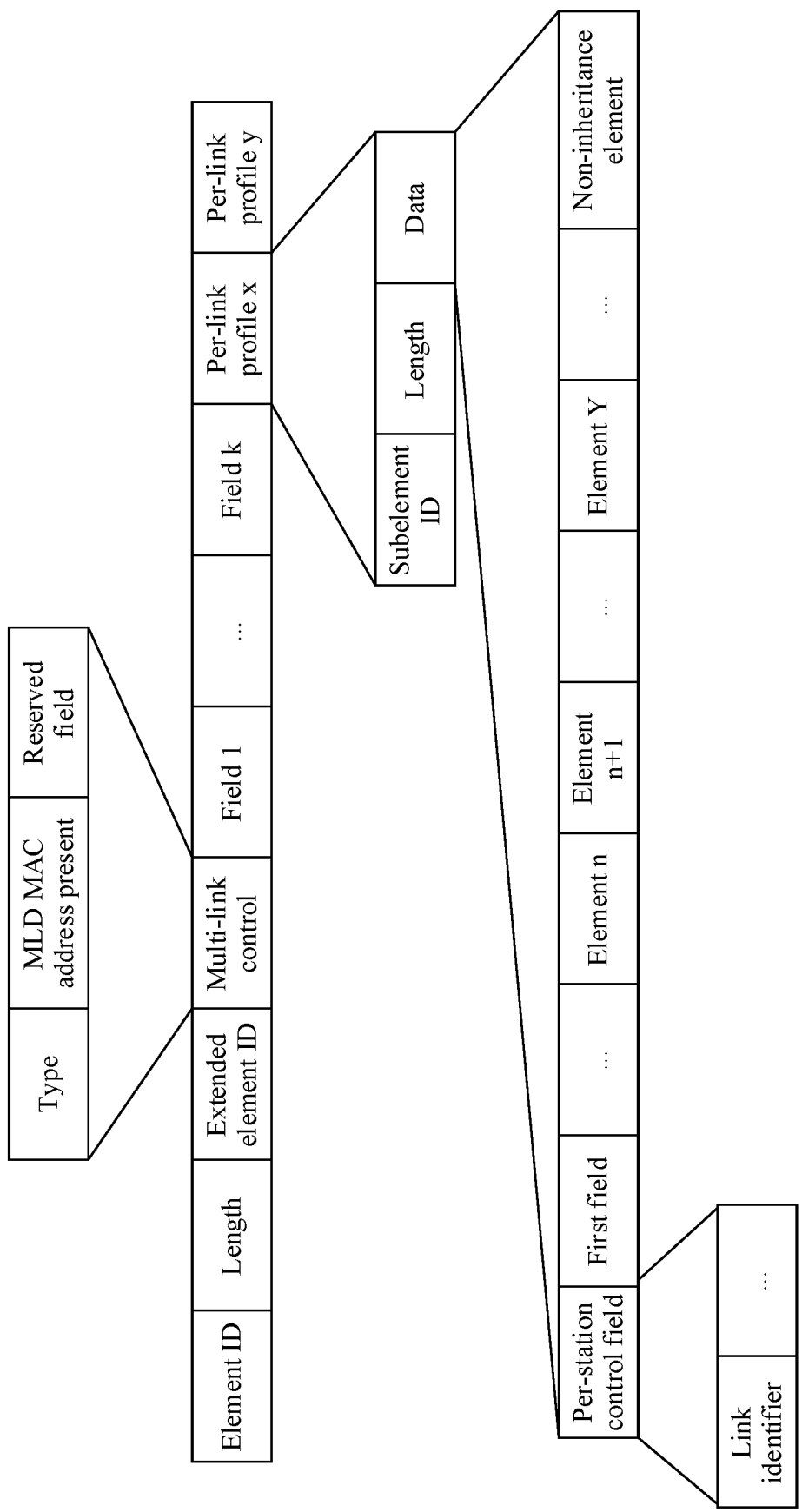
FIG. 5 is a schematic diagram of another frame structure of a multi-link element according to an embodiment of this application.

For example, as shown in FIG. 5, the first frame may include a multi-link element, the multi-link element includes a per-link profile, and the per-link profile includes a first field.

For example, the first field may have another name, for example, an action (action) field. This is not limited herein.

It should be understood that, different from design 1-1 to design 1-3, the first frame in design 1-4 may be used to flexibly reconfigure a link between the first MLD and the second MLD.

The foregoing design 1-1 to design 1-4 are merely examples, and a specific implementation of the first frame is not limited. It should be understood that, a design actually used for the first frame may be specified in the 802.11 protocol.

Optionally, the first frame may further include a second field, and the second field indicates the target link.

Optionally, the second field may use any one of the following designs.

Design 2-1: The second field includes a link identifier of the target link.

Design 2-2: The second field includes a bitmap, the bitmap includes at least one bit, and one bit in the bitmap indicates whether a link corresponding to the bit is the target link.

For example, if a value of a bit in the bitmap is 1, it indicates that a link corresponding to the bit is the target link; or if a value of a bit in the bitmap is 0, it indicates that a link corresponding to the bit is not the target link.

For another example, if a value of a bit in the bitmap is 0, it indicates that a link corresponding to the bit is the target link; or if a value of a bit in the bitmap is 1, it indicates that a link corresponding to the bit is not the target link.

Figure 6A:
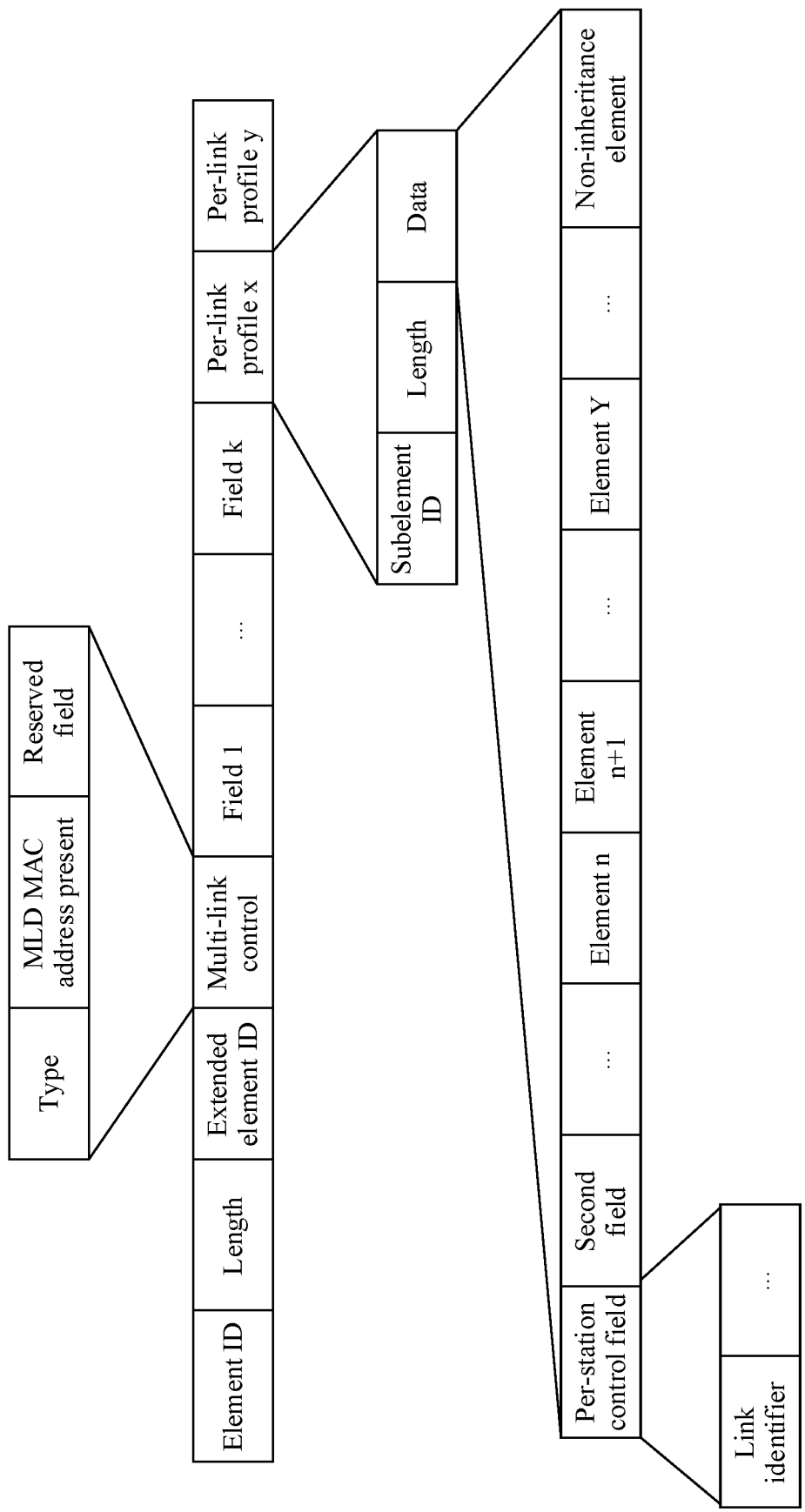
FIG. 6(a) is a schematic diagram of another frame structure of a multi-link element according to an embodiment of this application.

For example, as shown in FIG. 6(a), the first frame may include a multi-link element, the multi-link element includes a per-link profile, and the per-link profile includes a second field.

Figure 6B:
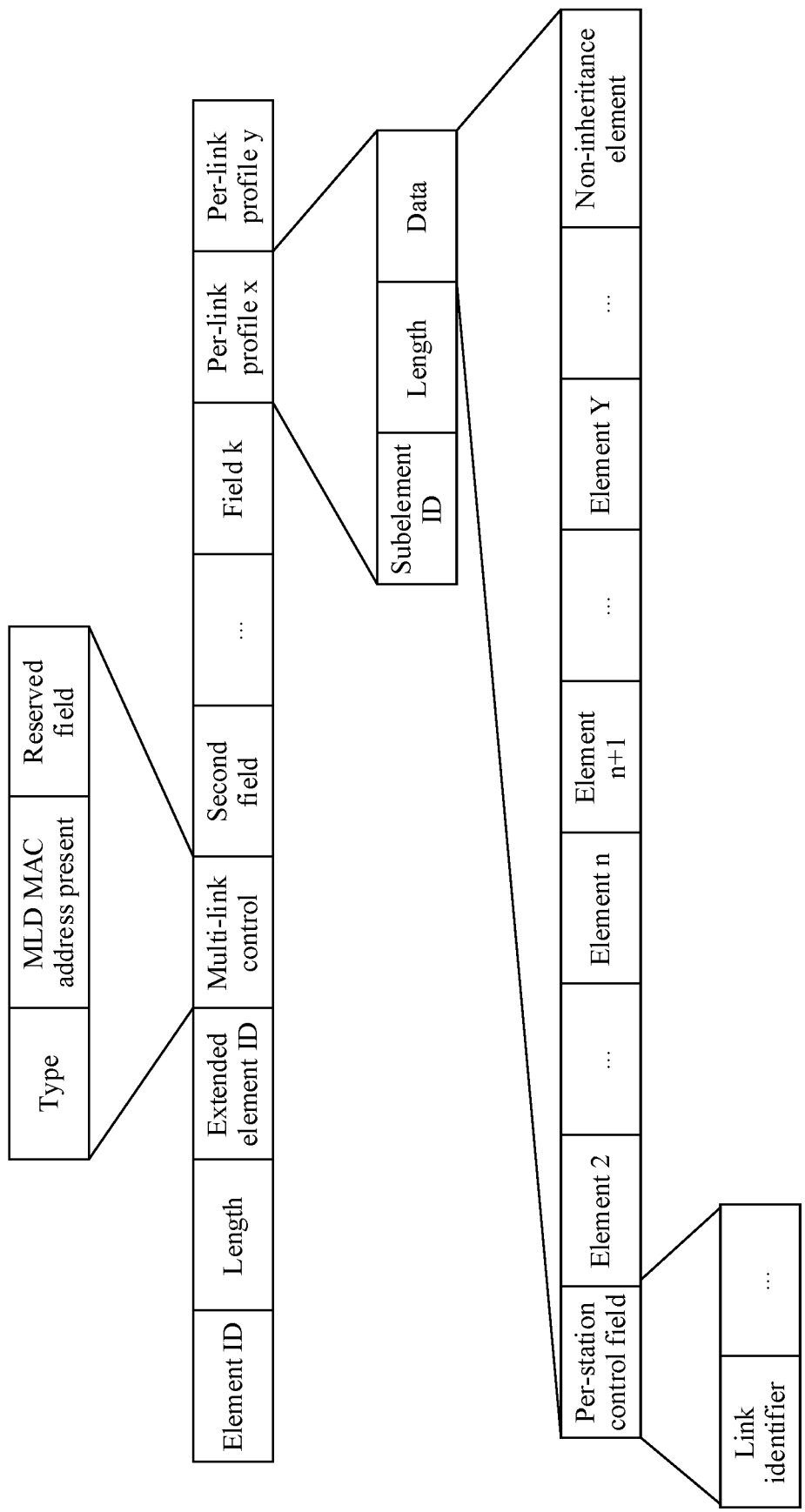
FIG. 6(b) is a schematic diagram of another frame structure of a multi-link element according to an embodiment of this application.

For example, as shown in FIG. 6(b), the first frame may include a multi-link element, and the multi-link element includes a second field.

For example, the second field may have another name, for example, a target link set (target link set) field. This is not limited herein.

The following describes specific implementations of the second field with reference to different implementations.

Implementation 1: The second field specifically indicates the target link in all links supported by the first MLD or all links supported by the second MLD.

Optionally, based on implementation 1, if the second field includes a bitmap, a quantity of bits in the bitmap may be the same as a quantity of links supported by the first MLD, so that the bits in the bitmap are in a one-to-one correspondence with the links supported by the first MLD. Alternatively, a quantity of bits in the bitmap may be the same as a quantity of links supported by the second MLD, so that the bits in the bitmap are in a one-to-one correspondence with the links supported by the second MLD.

Implementation 2: The second field specifically indicates the target link in one or more second links. The second links are other links in the links supported by the first MLD except the first link. The first link is a link used to communicate the first frame.

Optionally, based on implementation 2, if the second field includes a bitmap, a quantity of bits of the bitmap may be the same as a quantity of second links. Therefore, the bits in the bitmap are in a one-to-one correspondence with the second links.

It should be understood that, based on implementation 2, the second field does not indicate whether the first link is the target link.

Optionally, when the second field uses implementation 2, the first frame may explicitly indicate whether the first link is the target link. For example, the first frame may further include a third field, and the third field indicates whether the first link is the target link. For example, the third field may occupy one bit.

Figure 7:
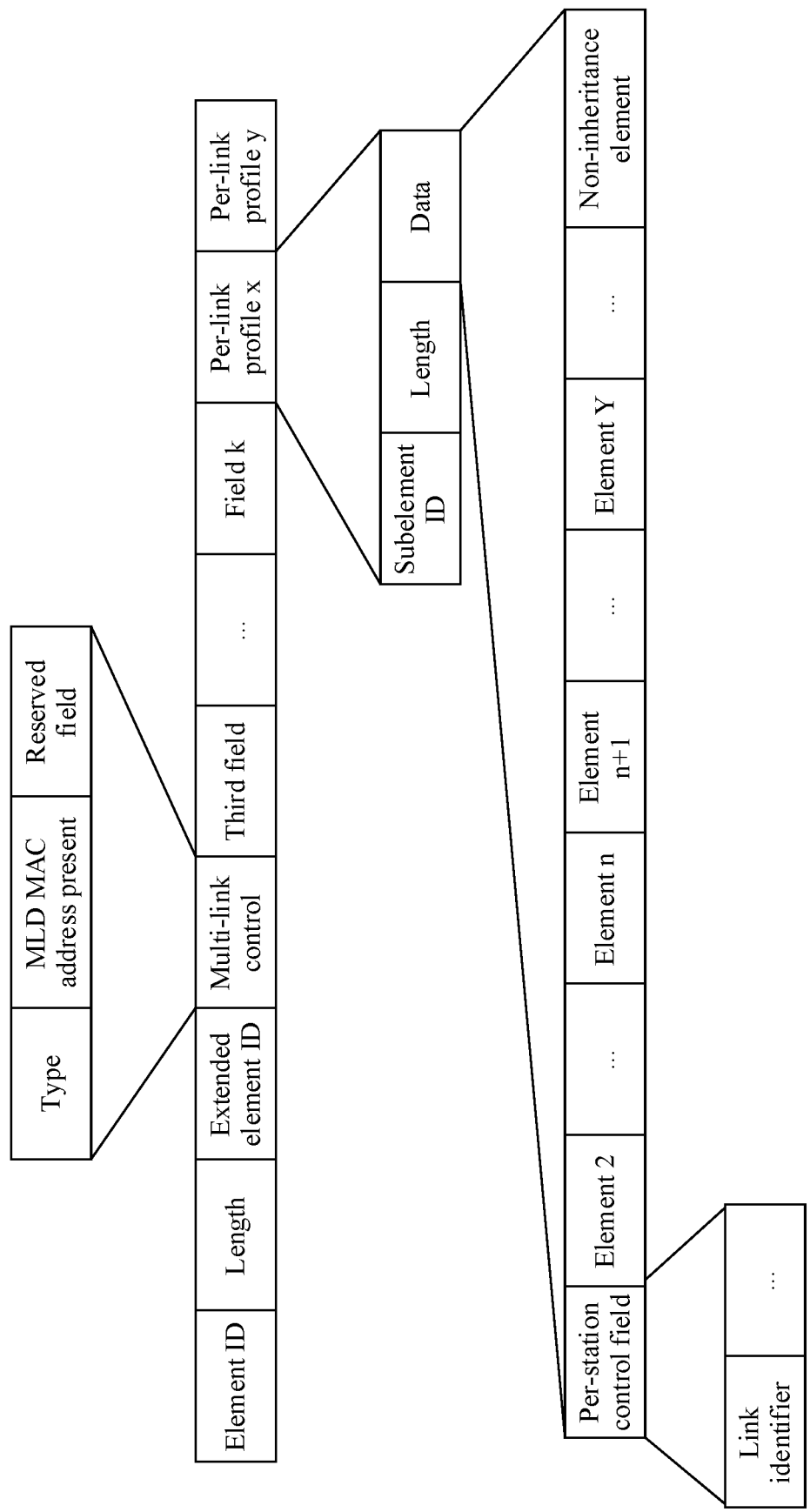
FIG. 7 is a schematic diagram of another frame structure of a multi-link element according to an embodiment of this application.

For example, as shown in FIG. 7, the first frame may include a multi-link element, and MLD-level info in the multi-link element includes a third field.

Optionally, when the second field uses implementation 2, the first frame may implicitly indicate whether the first link is the target link.

For example, if the first frame is used to add the target link, and the first link is an unestablished link between the first MLD and the second MLD, the first link may be considered as the target link by default.

For another example, if the first frame is used to remove the target link, and the first link is an established link between the first MLD and the second MLD, the first link may be considered as the target link by default.

For another example, the first frame indicates the target link, and the first link may be considered as the target link by default.

Optionally, when the first frame reuses a reassociation request frame, refer to Table 1 for a frame structure of the first frame.

TABLE 1

| No. | Information |
|---|---|
| 1 | Capability information |
| 2 | Listen interval |
| 3 | Current AP address |
| 4 | Service set identifier (SSID) |
| 5 | Support rates and basic service set (BSS) membership selectors (support rates and BSS membership selectors) |
| 6 | Extended supported rates and BSS membership selectors |
| 7 | Power capability |
| 8 | Supported channels |
| ... | ... |

It should be understood that Table 1 shows only some information elements, and the first frame may further include another information element. This is not limited.

Optionally, when the first frame reuses a disassociation frame, refer to the Table 2 for a frame structure of the first frame.

TABLE 2

| No. | Information |
|---|---|
| 1 | Reason code |
| ... | ... |
| Last but one | Vendor specific information elements |
| Last one | Management message integrity code element |

It should be understood that Table 2 shows only some information elements, and the first frame may further include another information element. This is not limited.

Optionally, when the first frame reuses a reassociation request frame or a disassociation frame, the first frame may include a multi-link element. In addition, the first frame may be distinguished from an existing reassociation request frame or disassociation frame by using a type field in a multi-link control field in the multi-link element.

For example, the type field whose value is a first preset value indicates that the first frame is used to reconfigure a link between the first MLD and the second MLD. The first preset value is not 0 or 1. For example, the first preset value may be 2.

For example, refer to Table 3 for the type field provided in embodiments of this application.

TABLE 3

| Value of the type field | Multi-link element variant name |
|---|---|
| 0 | Basic |
| 1 | Probe request |
| 2 | Multi-link reconfiguration |
| TBD (to be determined, TBD) | Reserved |

It can be learned that in embodiments of this application, a new multi-link element variant name is defined by using a reserved value (for example, 2) of the existing type field. Therefore, a device may determine that a frame using the multi-link element variant name is used for multi-link reconfiguration.

It should be understood that, compared with that the first frame is an action frame of a new type, the first frame reuses the reassociation request frame or the disassociation frame, which helps avoid excessive changes to the existing protocol. In addition, information that should be carried in the first frame does not need to be redefined, which further saves a reserved value of a category field in the action frame.

S102: The first MLD sends the first frame to the second MLD. Correspondingly, the second MLD receives the first frame from the first MLD.

S103: The second MLD parses the first frame.

Based on the embodiment shown in FIG. 4, the first MLD sends the first frame to the second MLD to trigger link reconfiguration between the first MLD and the second MLD, so as to meet a requirement for communication between the two MLDs and ensure normal communication between the two MLDs.

Currently, a peer device involved in reassociation of a device and a peer device involved in initial association of the device may not be a same device. For example, device 1 is associated with device 2 in initial association and associated with device 3 in reassociation. Therefore, some information stored in the device is not applicable to communication with the peer device involved in reassociation. Therefore, according to the 802.11 protocol, during reassociation, the device deletes some information, such as enhanced distributed channel access (EDCA) function status, block acknowledgment protocol, sequence number (SN), packet number (PN), duplicate detection cache, data queued for transmission, fragment and reassembly buffer, power management mode, and wireless network management sleep mode. Then, the device renegotiates with the peer device involved in the reassociation to obtain the information.

Different from an existing reassociation procedure, when the first frame reuses the reassociation request frame, the first MLD and the second MLD may not delete the foregoing information, so as to avoid operation overheads caused by subsequent negotiation to obtain the information. In other words, after the first MLD sends the first frame to the second MLD, the first MLD and the second MLD may continue to buffer the following information: enhanced distributed channel access function status, block acknowledgment protocol, sequence number, packet number, duplicate detection cache, data queued for transmission, fragment and reassembly buffer, power management mode, wireless network management sleep mode, and the like.

Figure 8:
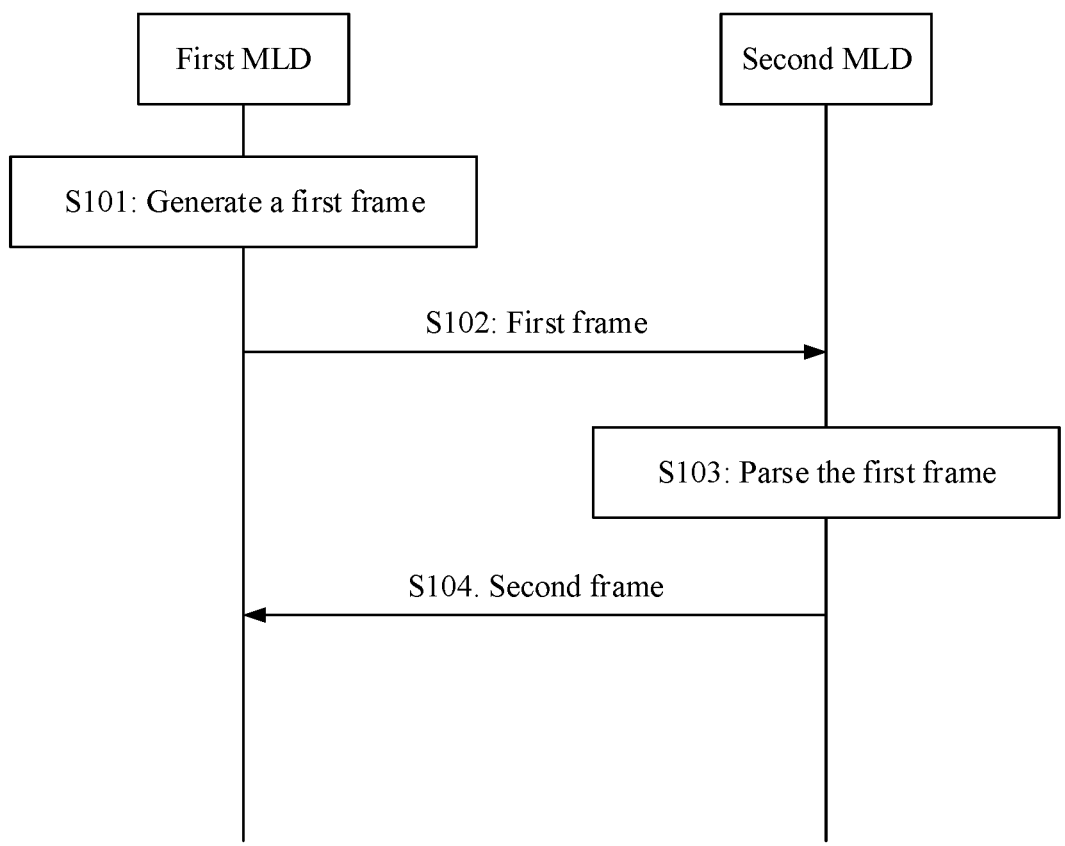
FIG. 8 is a flowchart of another multi-link reconfiguration method according to an embodiment of this application.

Optionally, based on the embodiment shown in FIG. 4, the multi-link reconfiguration method may further include step S104 after step S103 in the embodiment shown in FIG. 8.

S104: The second MLD sends a second frame to the first MLD. Correspondingly, the first MLD receives the second frame from the second MLD.

The second frame is used to respond to the first frame.

Optionally, when the first frame reuses the disassociation frame, the second frame may be an acknowledgment (ACK) frame.

Optionally, when the first frame is a newly defined frame, the second frame may also be a newly defined frame. The second frame may indicate whether to accept reconfiguration of the link between the first MLD and the second MLD.

Optionally, when the first frame reuses the reassociation request frame, the second frame may reuse the reassociation response frame. The second frame may indicate whether to accept reconfiguration of the link between the first MLD and the second MLD.

For example, when the second frame reuses the reassociation response frame, refer to Table 4 for a frame structure of the second frame.

TABLE 4

| No. | Information |
|---|---|
| 1 | Capability information |
| 2 | Status code |
| 3 | Association identifier (AID) |
| 4 | Supported rates and BSS member selectors |
| 5 | Extended supported rates and BSS membership selectors |
| 6 | EDCA parameter set |
| ... | ... |

The status code may indicate a response to a reconfiguration operation requested by the first frame.

For example, for a specific configuration of the status code, refer to Table 5.

TABLE 5

| Value of status code | Name | Meaning |
|---|---|---|
| 0 | Success | Success |
| 1 | Refused, refused reason unspecified | Unspecified failure |
| 2 | Tunneled direct link setup rejected, alternative provided. | Tunneled direct link setup rejected but alternative schedule provided |
| ... | ... | ... |

It should be understood that "refused reason unspecified" means that the peer device refuses the reconfiguration operation requested by the first frame, but does not provide a refused reason.

In a possible design, the second frame may include only one status code, and the status code is for all target links.

For example, the first frame may indicate to add link 1 and link 2, and the status code in the second frame indicates a success. In this case, link 1 and link 2 are established between the first MLD and the second MLD.

For another example, the first frame may indicate to add link 1 and link 2, and the status code in the second frame indicates rejection. In this case, link 1 and link 2 are not established between the first MLD and the second MLD.

In another possible design, the second frame may include one or more status codes.

One status code corresponds to one target link, and the status code indicates a reconfiguration status of a corresponding target link.

For example, the first frame may indicate to add link 1 and link 2, a status code corresponding to link 1 in the second frame indicates a success, and a status code corresponding to link 2 in the second frame indicate a failure. In this case, link 1 is established but link 2 is not established between the first MLD and the second MLD.

For another example, the first frame may indicate to remove link 1 and link 2, a status code corresponding to link 1 in the second frame indicates a success, and a status code corresponding to link 2 in the second frame indicates a failure. In this case, link 1 is removed but link 2 is not removed between the first MLD and the second MLD.

Figure 9A:
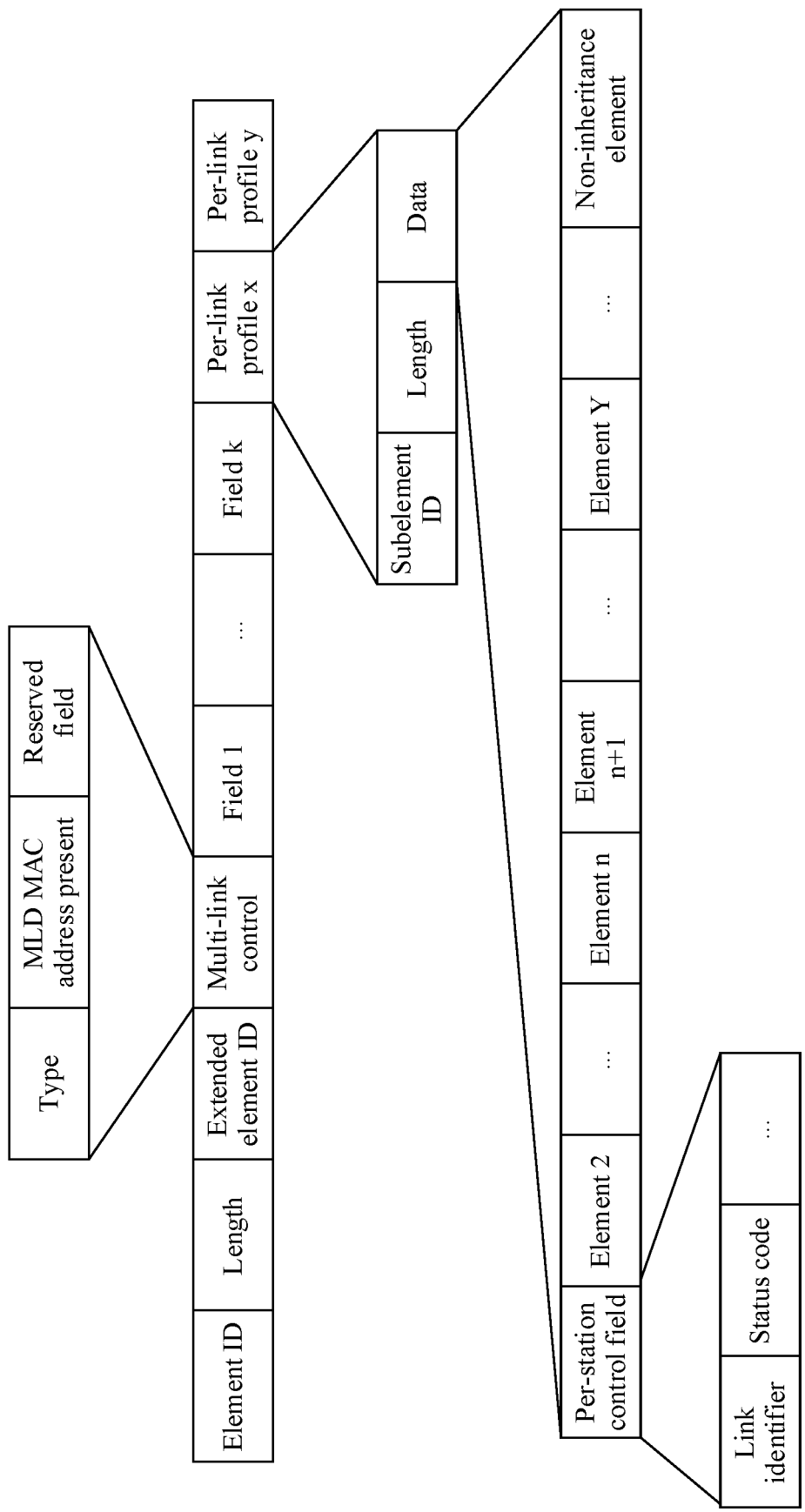
FIG. 9(a) is a schematic diagram of another frame structure of a multi-link element according to an embodiment of this application.

Optionally, for a target link that is not the first link, a status code corresponding to the target link may be located in a per-link profile corresponding to the target link. For example, as shown in FIG. 9(a), the second frame may include a multi-link element including a per-link profile, the per-link profile includes a per STA control field, and the per STA control field includes a status code.

Figure 9B:
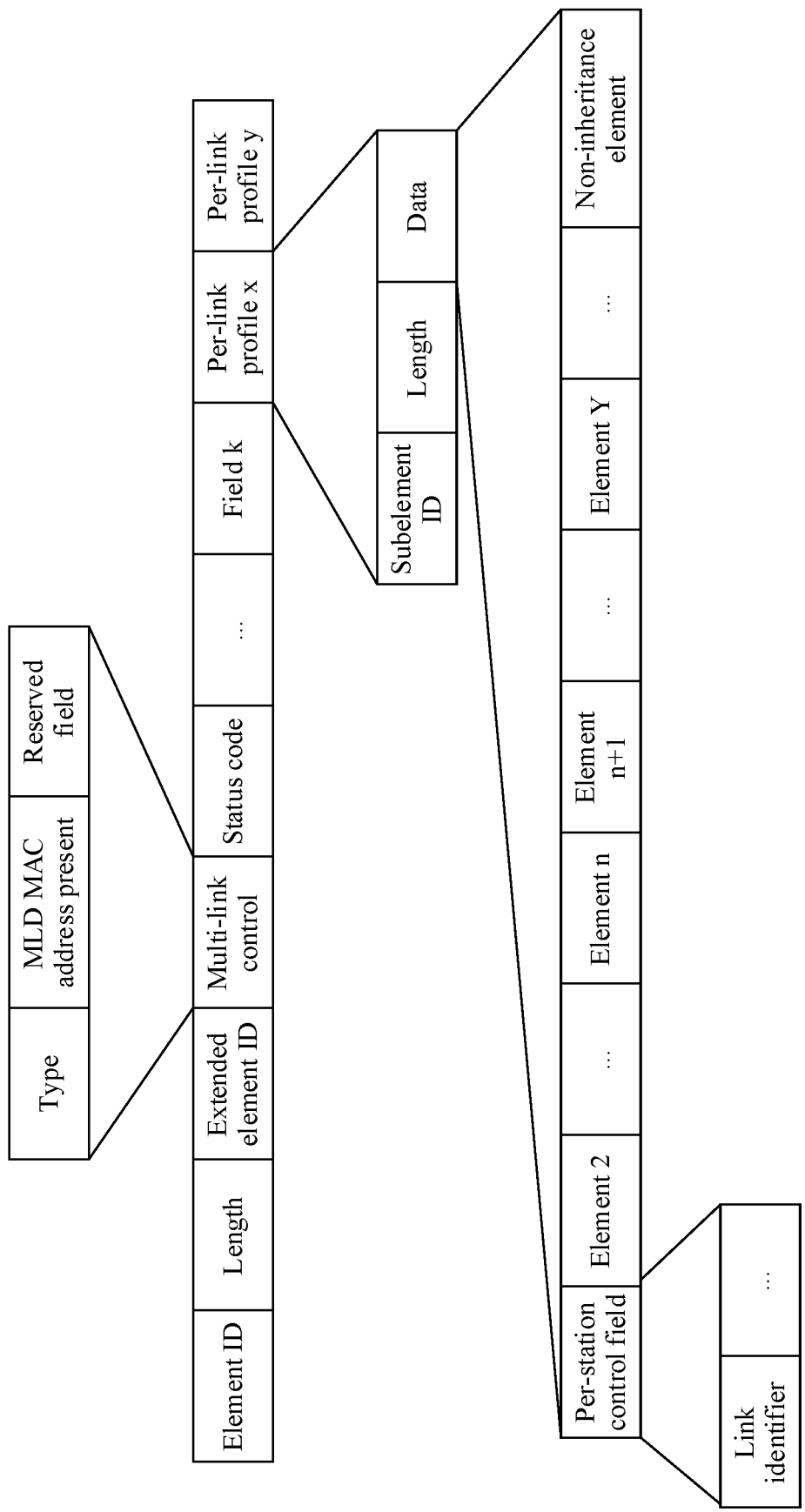
FIG. 9(b) is a schematic diagram of another frame structure of a multi-link element according to an embodiment of this application.

Optionally, when the first link is a target link, a status code corresponding to the target link may be a fixed field carried in a frame body, or may be located in MLD-level info in the multi-link element. For example, as shown in FIG. 9(b), the second frame may include a multi-link element, and the multi-link element may include a status code corresponding to the first link.

Optionally, when the first link is not a target link, the status code may be set to a reserved value or the status code corresponding to the first link is disregarded (disregard) in the second frame.

Optionally, when the second frame reuses a reassociation response frame, the second frame may be distinguished from an existing reassociation response frame by using a type field in the multi-link control field in the multi-link element. For example, the type field whose value is a first preset value indicates that the first frame is used to reconfigure a link between the first MLD and the second MLD. The first preset value is not 0 or 1. For example, the first preset value may be 2.

According to the embodiment shown in FIG. 8, the second MLD sends a second frame to the first MLD, to enable the first MLD to learn how to reconfigure the link between the first MLD and the second MLD.

Figures 10, 11A:
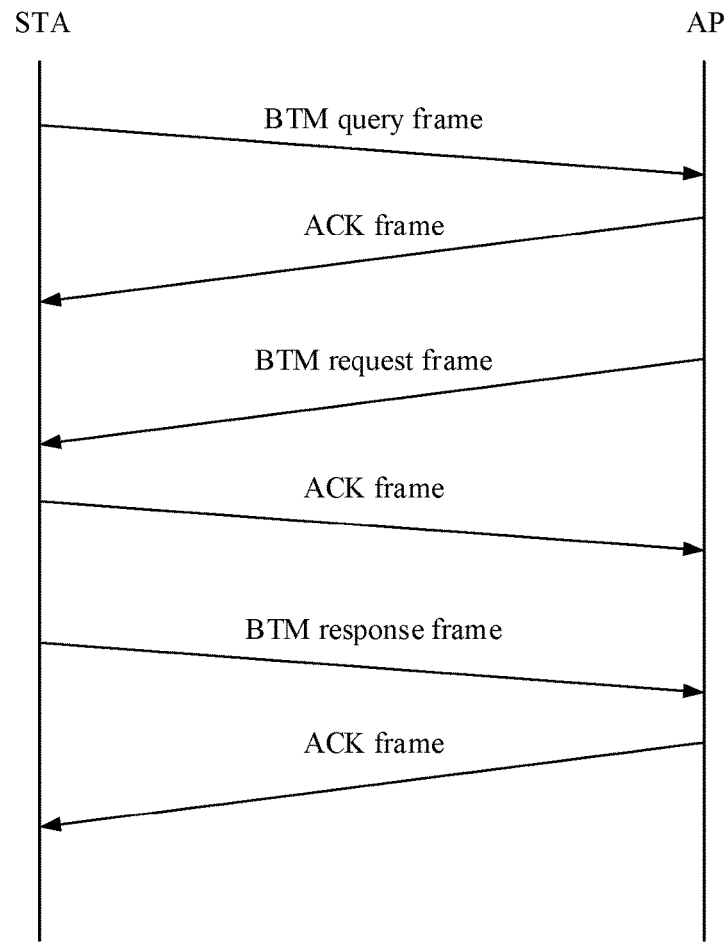
FIG. 10 is a schematic diagram of a BTM procedure in a related technology.
FIG. 11(a) is a schematic diagram of a frame structure of a BTM query frame in a related technology.

Currently, the STA and its affiliated AP may perform negotiation before BSS transition based on a BTM procedure, so that the STA may transition to a better BSS. For example, as shown in FIG. 10, the BTM procedure may include the following steps.

When the STA finds that link quality is poor or due to other reasons, the STA may send a basic service set transition management (BSS transition management, BTM) query (query) frame to its affiliated AP. It should be understood that the step of sending the BTM query frame is optional. After receiving the BTM query sent by the STA, the AP may reply with an ACK frame.

When the AP wants the STA to perform BSS transition, the AP may send a BTM request frame to the STA. After receiving the BTM request frame, the STA may reply with an ACK frame.

The STA may send a BTM response frame to the AP, to indicate to accept or reject the BSS transition request. After receiving the BTM response frame, the AP may reply with an ACK frame.

For example, as shown in FIG. 11(a), the BTM query frame may include the following fields: category, radio network management action (WNM action), dialog token, BSS transition query reason, and BSS transition candidate list. The BSS transition candidate list is optional.

The BSS transition query reason field indicates a reason for sending the BTM query frame. For example, for a structure of the BSS transition query reason field in the related technology, refer to Table 6.

TABLE 6

| Value of the BSS transition query reason field | Description |
| --- | --- |
| 0 | Unspecified |
| 1 | Excessively high packet loss rate or poor link quality |
| 2 | Excessively high latency |
| ... | ... |

The BSS transition candidate list field carries one or more neighbor report elements.

Figure 11B:
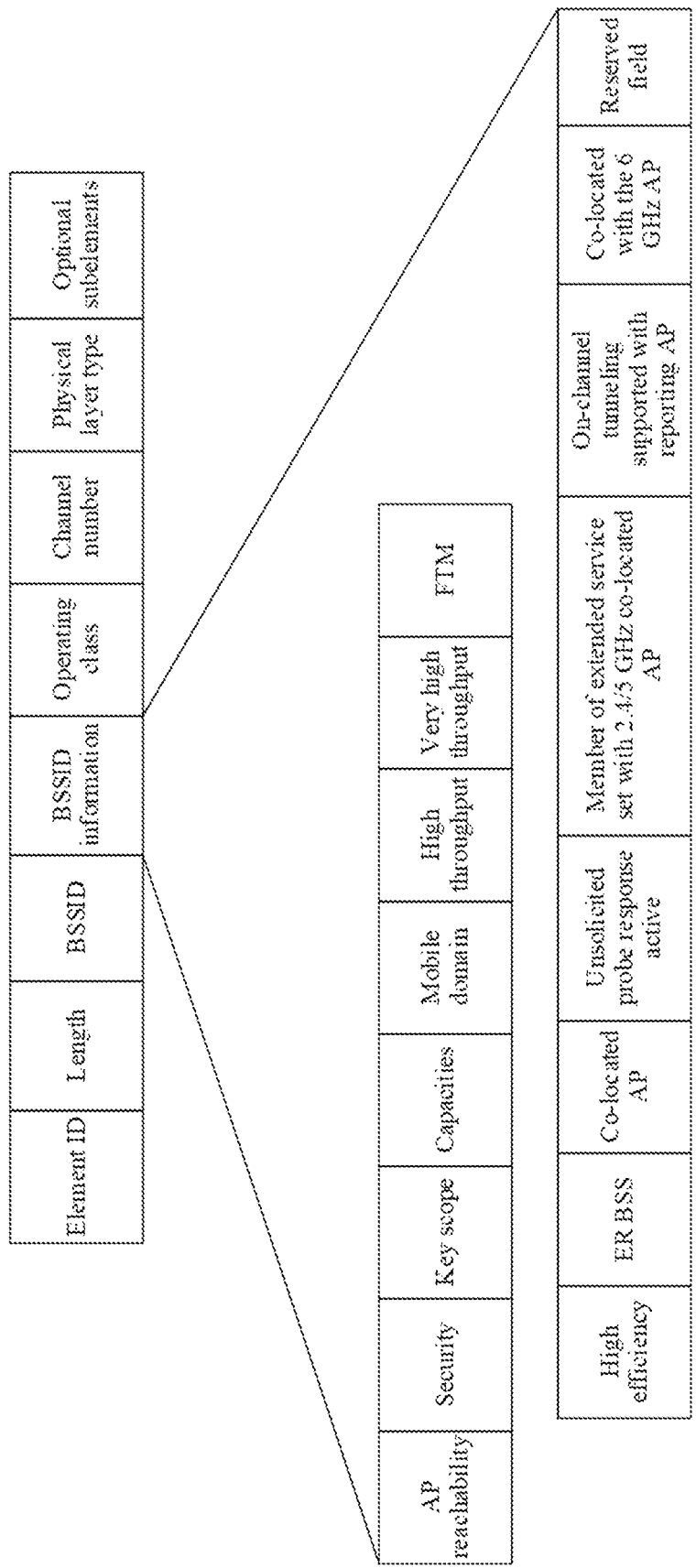
FIG. 11(b) is a schematic diagram of a frame structure of a neighbor report element in a related technology.

For example, as shown in FIG. 11(b), the neighbor report element includes the following elements: element ID, length, BSSID, BSSID information (info), operating class, channel number, physical layer type (PHY type), and optional subelements.

The BSSID field indicates a reported BSSID corresponding to a neighboring AP. The BSSID information field indicates related information about the reported BSSID. The operating class field and the channel number field indicate a channel to which the reported BSSID belongs. PHY type field indicates a physical layer type of the AP corresponding to the reported BSSID.

Optionally, the BSSID information field may include the following fields: AP reachability, security, key scope, capabilities, mobile domain, high throughput, very high throughput, fine timing measurement (FTM), high efficiency, extended range BSS (ER BSS), co-location AP, and unsolicited probe response active, member of extended service set with 2.4/5 GHz co-located AP, on-channel tunneling (OCT) supported with reporting AP (OCT supported with reporting AP), co-located with 6 GHz AP, and reserved.

Figure 12:
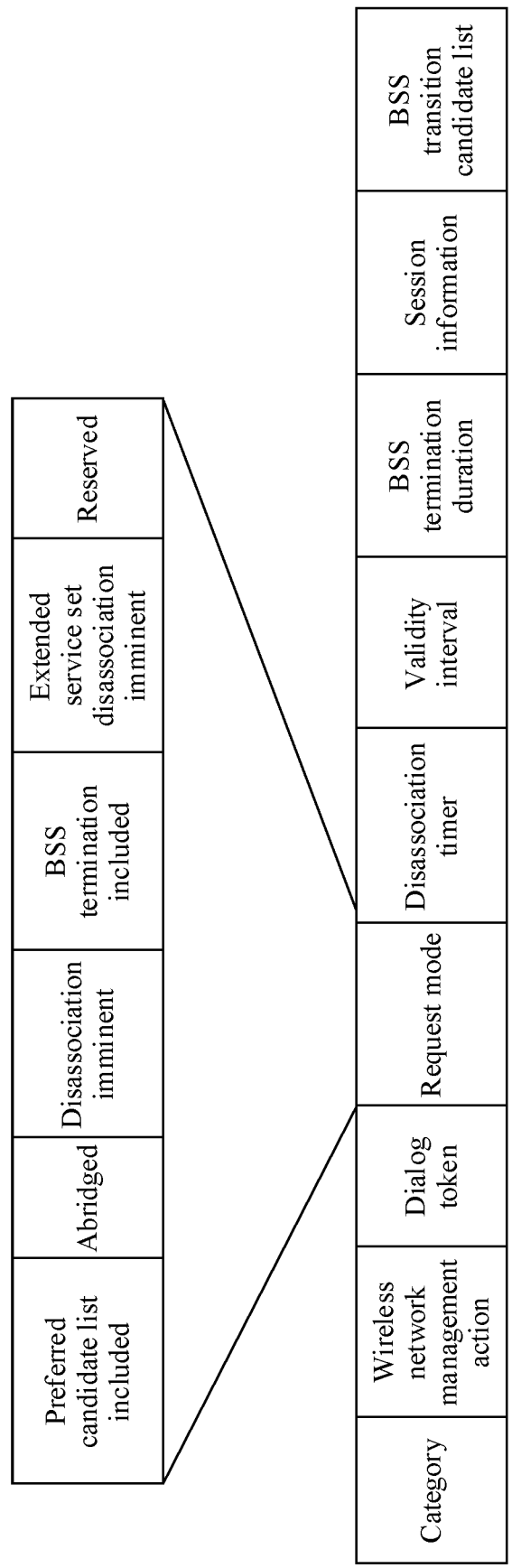
FIG. 12 is a schematic diagram of a frame structure of a BTM request frame in a related technology.

For example, as shown in FIG. 12, the BTM request frame may include the following fields: category, radio network management action, dialog token, request mode, disassociation timer, validity interval, BSS termination duration, session information (session info URL), and a BSS transition candidate list. The BSS transition candidate list is optional.

The validity interval field indicates a quantity of beacon intervals in which the BSS transition candidate list is valid.

The disassociation timer field indicates a time after which the AP sends a disassociation frame.

The request mode field indicates a specific request mode. The request mode field may include the following fields: preferred candidate list included, abridged, disassociation imminent, BSS termination included, extended service set (ESS) disassociation imminent (ESS disassociation imminent), and reserved bits. Three bits are reserved.

The preferred candidate list included field indicates whether a preferred candidate list is carried.

The abridged field is used as follows: The abridged field is set to 0 if an affiliated AP does not recommend or forbids the STA to switch to a BSS that does not appear in the preferred candidate list. The abridged field is set to 1 if the associated AP sets a preference value (preference value) of a BSS that does not appear in the preferred candidate list to 0.

The disassociation imminent field is used as follows: When the disassociation imminent field is set to 1, it indicates that the AP sends a disassociation frame to disassociate from the STA; when the disassociation imminent field is set to 0, it indicates that the AP does not send a disassociation frame to disassociate from the STA.

The BSS termination included field indicates whether the BSS will be terminated.

The ESS disassociation imminent field indicates whether the STA is disassociated from the entire ESS.

For example, as shown in FIG. 13, the BTM response frame may include the following fields: category, radio network management action, dialog token, BTM status code, BSS termination delay, target BSSID, and BSS transition candidate list. The target BSSID and the BSS transition candidate list are optional. Currently, in the related technology, when a value of the BTM status code is 0, the BTM response frame includes the target BSSID field.

The BTM status code indicates whether the BSS transition request is accepted. The BSS termination delay indicates a duration of a time period from a current time to a BSS termination time.

For example, for details on the BTM status code, refer to Table 7.

TABLE 7

| Value of BTM status code | Description |
| --- | --- |
| 0 | Accept |
| 1 | Reject due to unspecified reason |
| 2 | Reject due to insufficient beacon or probe response frames received from candidate neighbors |
| 3 | Rejected due to insufficient available capacity from candidate neighbors |
| ... | ... |

Figure 14:
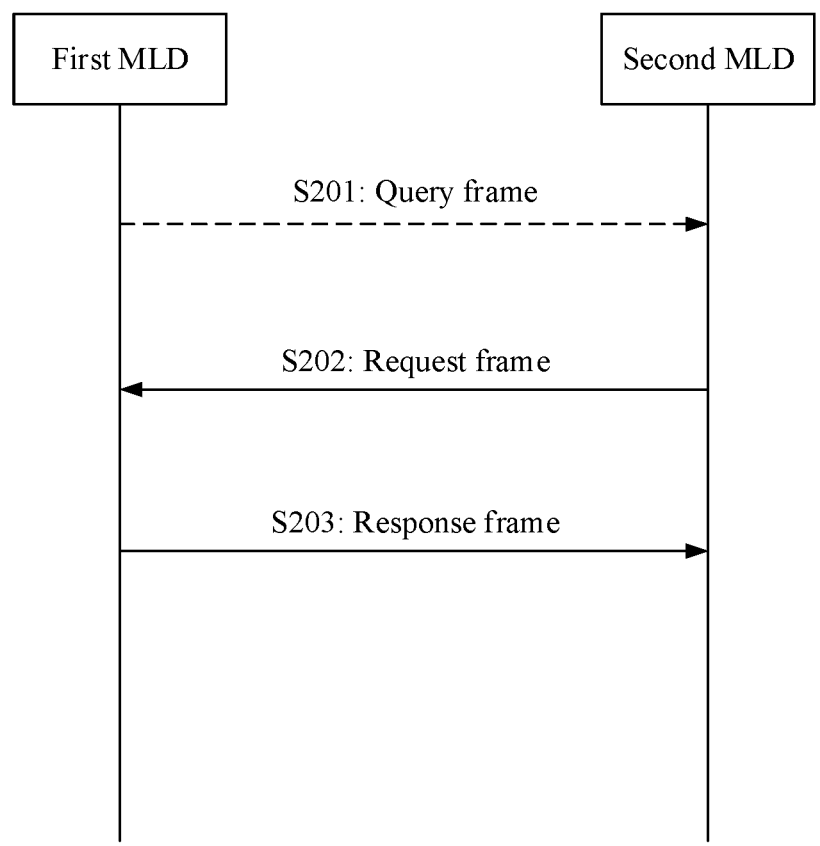
FIG. 14 is a flowchart of another multi-link reconfiguration method according to an embodiment of this application.

According to a current BTM procedure, before link transition is performed between two MLDs, the two MLDs may also perform link transition negotiation, so that the two MLDs may transition from a currently established link to a better link for communication. In view of this, an embodiment of this application provides a multi-link reconfiguration method. As shown in FIG. 14, the method includes the following steps.

S201 (optional): A first MLD sends a query frame to a second MLD. Correspondingly, the second MLD receives the query frame from the first MLD.

In a possible design, the query frame may be an existing BTM query frame. That is, the first MLD does not determine whether to perform link transition negotiation or BSS transition negotiation. Instead, the second MLD determines, according to an actual situation, whether to perform link transition negotiation or BSS transition negotiation.

In another possible design, the first MLD may determine to perform link transition negotiation. Therefore, the query frame is used to negotiate link transition between the first MLD and the second MLD.

Based on this design, the query frame may be a newly defined frame. Alternatively, the query frame may reuse an existing BTM query frame.

Optionally, the query frame may include one or more neighbor report elements. It should be understood that each neighbor report element corresponds to one AP adjacent to the first MLD.

In some embodiments, when an AP adjacent to the first MLD is affiliated with an AP MLD, the neighbor report element may include a basic multi-link element, and the basic multi-link element may include a MAC address, a quantity of supported links, capability information, and the like of the AP MLD with which the AP adjacent to the first MLD is affiliated.

Optionally, the basic multi-link element in the neighbor report element may not include a per-link profile, to reduce signaling overheads.

Optionally, when the query frame reuses an existing BTM query frame, the query frame may include a multi-link element, and the query frame may determine, based on a type field in a multi-link control field in the multi-link element, that the query frame is used for link transition negotiation. For example, the type field whose value is a second preset value indicates that the query frame is used to negotiate link transition between the first MLD and the second MLD. The second preset value is not 0 or 1. Optionally, the second preset value may be the same as the foregoing first preset value. This is not limited.

Optionally, when the query frame reuses an existing BTM query frame, one or more values may be newly defined for the transition query reason field in the query frame, to indicate a reason for link transition, for example, a high link frame loss rate, poor link quality, or better link found.

Optionally, the query frame may further include a link identifier or a link bitmap that indicates a link with a high link frame loss rate.

Optionally, after receiving the query frame, the second MLD may send an ACK frame to the first MLD.

S202: The second MLD sends a request frame to the first MLD. Correspondingly, the first MLD receives the request frame from the second MLD.

The request frame is used to request link transition between the first MLD and the second MLD.

Optionally, the request frame may be used to indicate a recommended link. The recommended link may also be referred to as a suggested link, a candidate link, or another name. This is not limited.

Optionally, the request frame may be a newly defined frame. Alternatively, the request frame may reuse an existing BTM request frame.

Optionally, when the request frame reuses an existing BTM request frame, the request mode field in the request frame may include a fourth field, and the fourth field may indicate a new request mode. The new request mode may be referred to as a link transition request mode, a link removal mode, or a link-level disassociation mode. For example, the fourth field may use a reserved bit of the request mode field in the existing BTM frame. For example, the fourth field may occupy one bit. For example, FIG. 22 shows a frame structure of the request mode field of the request frame. The fourth field may be the link removal field in FIG. 22.

Optionally, the request frame may include a multi-link element, and the request frame may determine, based on a type field in a multi-link control field in the multi-link element, that the request frame is used for link transition negotiation. For example, the type field whose value is a second preset value indicates that the request frame is used to negotiate link transition between the first MLD and the second MLD. The second preset value is not 0 or 1. Optionally, the second preset value may be the same as the foregoing first preset value. This is not limited.

Optionally, if the request frame is used to negotiate link removal, a value of a preferred candidate list included field in the request frame should be set to 0, to indicate that the request frame does not carry a preferred BSS transition candidate list.

Optionally, the request frame may include a transition candidate list field, and the transition candidate list field may include one or more neighbor report elements. Each neighbor report element corresponds to one AP adjacent to the second MLD.

Figure 15:
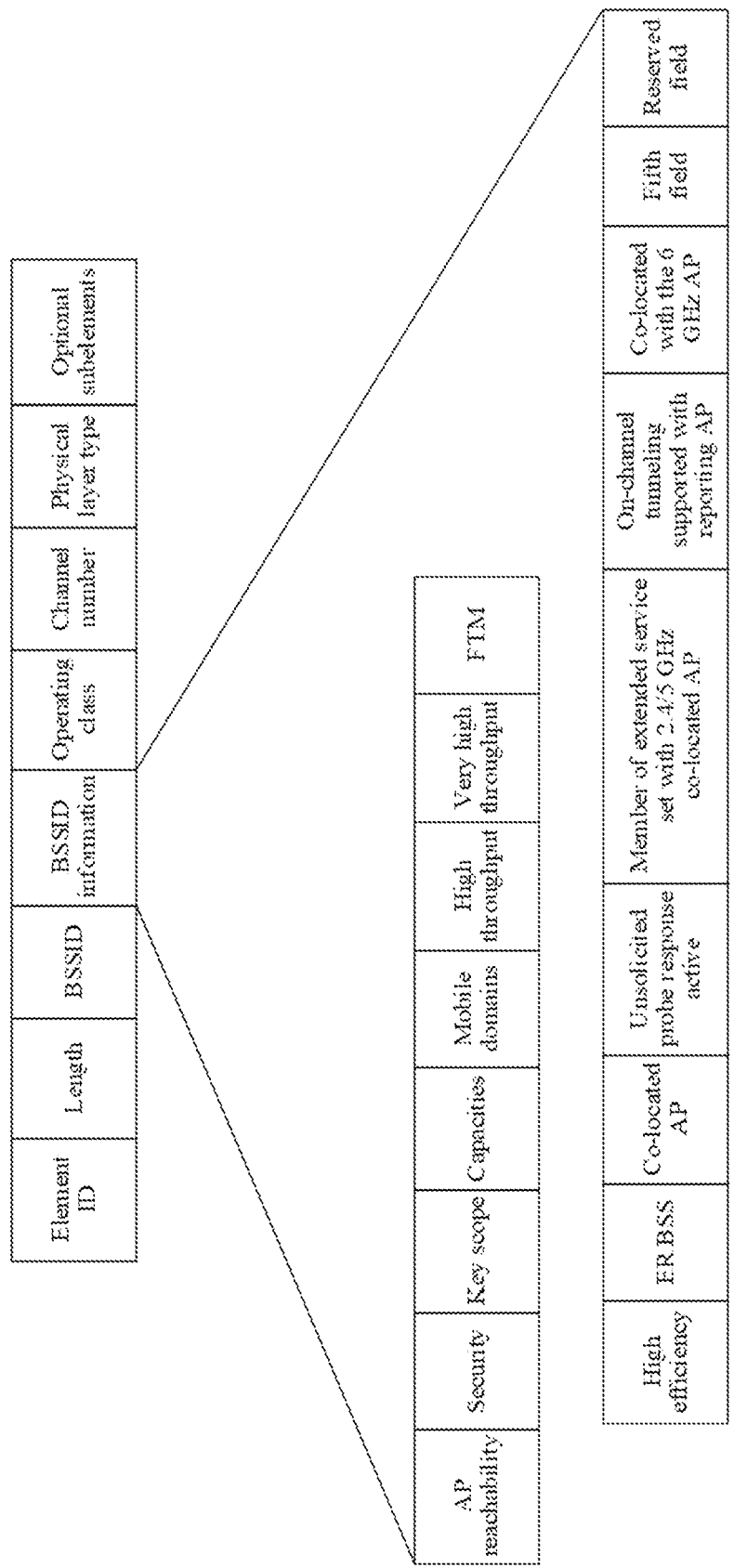
FIG. 15 is a schematic diagram of a frame structure of a neighbor report element according to an embodiment of this application.

As shown in FIG. 15, a fifth field may be added to a BSSID information field of a neighbor report element. The fifth field indicates an ID of an MLD to which a BSS corresponding to a link for request frame transmission belongs. In other words, the fifth field indicates that a device sending the request frame is the MLD. Therefore, after receiving the request frame, the first MLD may preferentially consider performing link transition with the second MLD.

Optionally, the fifth field may occupy all or some of reserved bits in the current BSSID information field.

For example, the fifth field may have another name, for example, an AP MLD ID field.

In some embodiments, when an AP adjacent to the second MLD is affiliated with an AP MLD, the neighbor report element may include a basic multi-link element, and the basic multi-link element may include an MLD MAC address, a quantity of supported links, capability information, and the like of the AP MLD with which the AP adjacent to the second MLD is affiliated.

Optionally, the basic multi-link element in the neighbor report element may not include a per-link profile, to reduce signaling overheads.

Optionally, after receiving the request frame, the first MLD may send an ACK frame to the second MLD.

S203: The first MLD sends a response frame to the second MLD. Correspondingly, the second MLD receives the response frame from the first MLD.

The response frame indicates whether to accept link transition between the first MLD and the second MLD.

Optionally, the response frame may be a newly defined frame. Alternatively, the response frame may reuse an existing BTM response frame.

Optionally, when the response frame reuses the existing BTM response frame, the BTM status code in the response frame may have one or more newly defined values, to indicate a link transition result, for example, link transition accepted or link transition rejected.

Optionally, if the response frame indicates link transition accepted or link removal, for example, a value of the BTM status code in the response frame is not 0, the response frame does not carry the target BSSID field or the neighbor report element. If the response frame indicates BSS transition accepted, for example, a value of the BTM status code in the response frame is 0, the response frame may further include the target BSSID field.

In some embodiments, if the first MLD chooses to establish a connection to an AP that supports only a single link, the target BSSID field may include a BSSID corresponding to the AP. Alternatively, if the first MLD chooses to establish a connection to an AP MLD, the target BSSID field may include an MLD media access control (media access control, MAC) address of the AP MLD.

Optionally, the response frame may include one or more neighbor report elements. It should be understood that each neighbor report element corresponds to one AP adjacent to the first MLD.

In some embodiments, when an AP adjacent to the first MLD is affiliated with an AP MLD, the neighbor report element may include a basic multi-link element, and the basic multi-link element may include an MLD MAC address, a quantity of supported links, capability information, and the like of the AP MLD with which the AP adjacent to the first MLD is affiliated.

Optionally, the basic multi-link element in the neighbor report element may not include a per-link profile, to reduce signaling overheads.

Optionally, after receiving the response frame, the second MLD may send an ACK frame to the first MLD.

As shown in FIG. 14, before link transition is performed, the first MLD and the second MLD may negotiate to determine a link with better communication quality. Therefore, after link transition is performed between the first MLD and the second MLD, communication may be performed on the link with better communication quality, thereby ensuring proper communication between the first MLD and the second MLD.

Currently, multiple stations may be configured for an MLD to support data transmission over multiple links. However, in some cases, there is a station removal requirement for an MLD. For example, when traffic volume of the MLD is relatively small, the MLD removes one or more stations, which helps reduce power consumption of the MLD. However, no corresponding solution is provided in the conventional technology.

Figure 18:
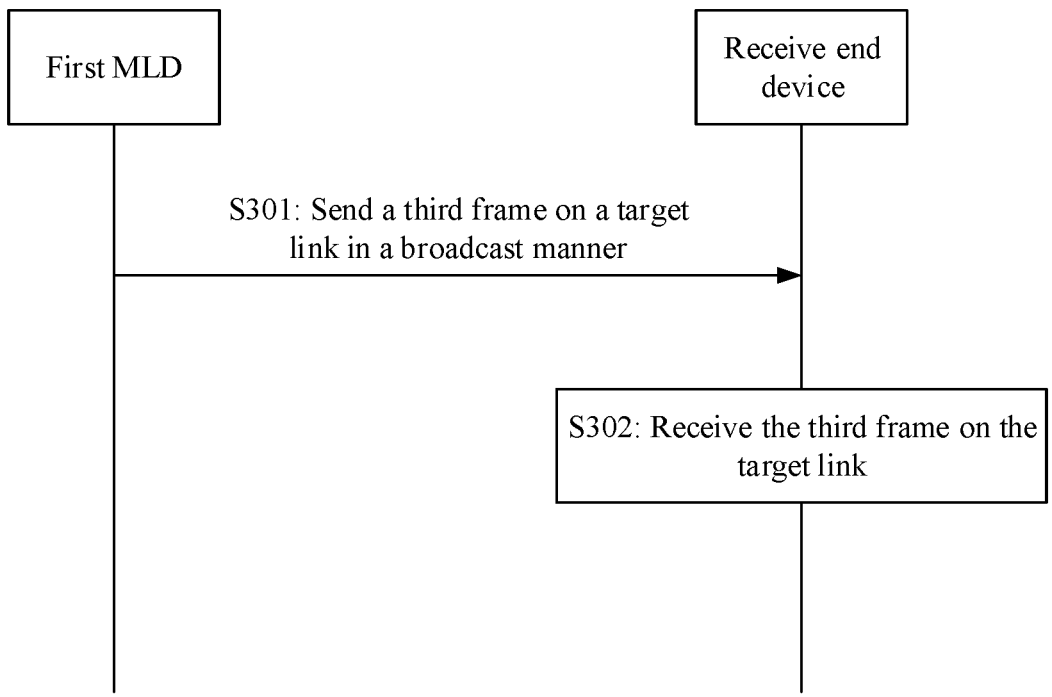
FIG. 18 is a flowchart of a multi-link reconfiguration method according to an embodiment of this application.
Figure 19:
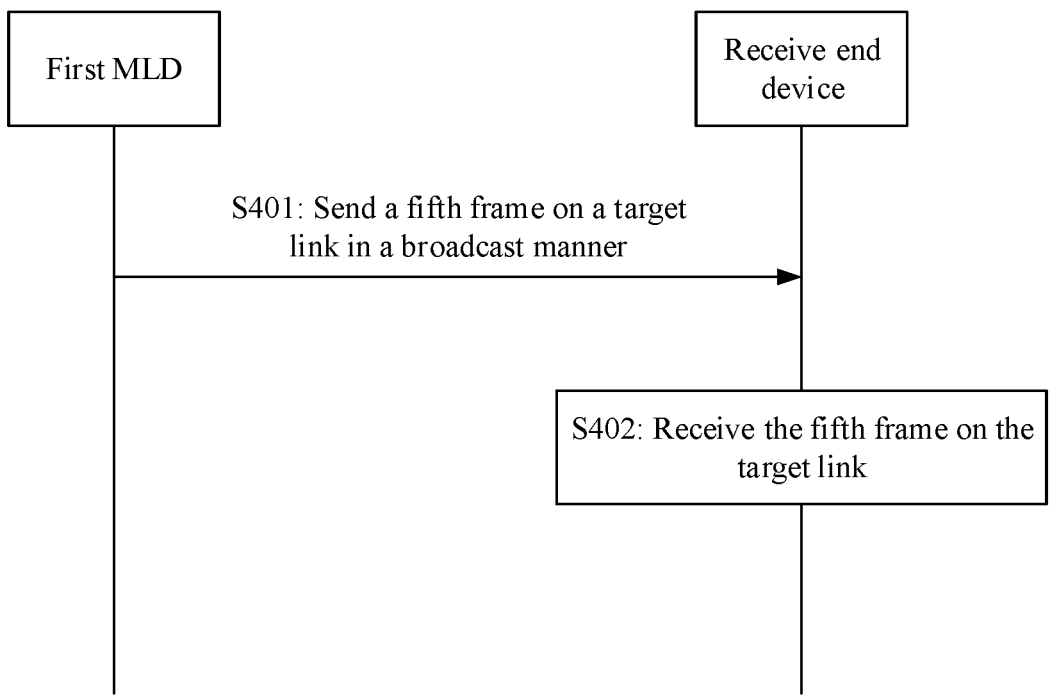
FIG. 19 is a flowchart of another multi-link reconfiguration method according to an embodiment of this application.
Figure 20:
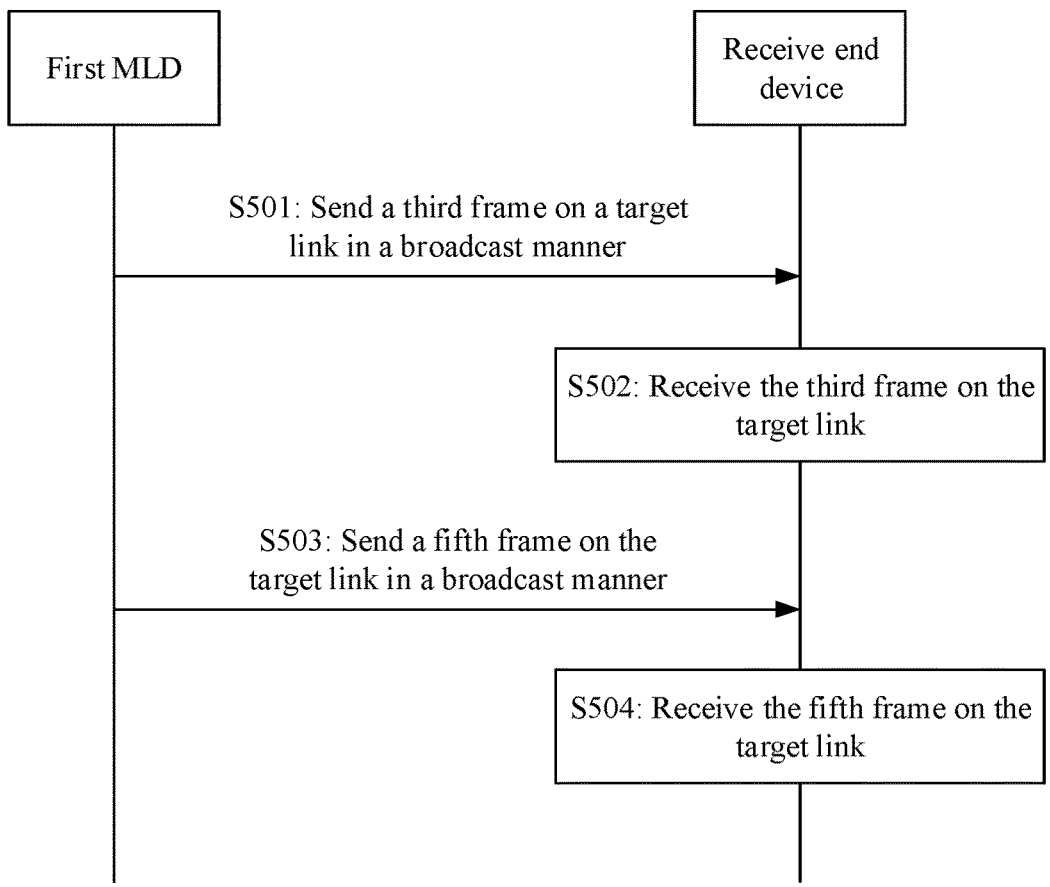
FIG. 20 is a flowchart of another multi-link reconfiguration method according to an embodiment of this application.

In view of this, embodiments of this application provide technical solutions shown in FIG. 18, FIG. 19, and FIG. 20, for an MLD to remove a station.

As shown in FIG. 18, an embodiment of this application provides a multi-link reconfiguration method. The method includes the following steps.

S301: A first MLD sends a third frame on a target link in a broadcast manner.

For the first MLD, the third frame indicates that the first MLD is to remove a target station, and the target station is a station that is affiliated with the first MLD and operates on a target link.

For example, the first MLD includes AP 1, AP 2, and AP 3. AP 1 operates on link 1, AP 2 operates on link 2, and AP 3 operates on link 3. When the first MLD is to remove AP 1, the first MLD sends the third frame on link 1 in a broadcast manner. When the first MLD is to remove AP 2, the first MLD sends the third frame on link 2 in a broadcast manner. When the first MLD is to remove AP 3, the first MLD sends the third frame on link 3 in a broadcast manner.

In a possible design, the third frame may reuse an existing frame, to ensure backward compatibility, that is, ensure that a conventional station supporting a protocol of an earlier version can parse the third frame. For example, the third frame may reuse a BTM request frame.

Optionally, if the third frame is a BTM request frame, and the third frame indicates that the first MLD is to remove the target station. A specific implementation may be as follows: The BTM request frame includes a sixth field whose value is a third preset value.

The sixth field whose value is the third preset value may indicate the MLD that receives the BTM request frame to disconnect the target link from the first MLD. The sixth field whose value is a fourth preset value may indicate the MLD that receives the BTM request frame to disassociate from the first MLD (that is, the MLD that receives the BTM request frame disconnects all links from the first MLD).

Optionally, the sixth field may occupy one or more reserved bits in an existing BTM request frame format. For example, when the sixth field occupies one bit, the third preset value may be 1, and the fourth preset value may be 0; or the third preset value may be 0, and the fourth preset value may be 1.

In another possible design, the third frame may be a newly defined management frame, for example, a link removal request frame.

S302: A receive end device receives the third frame on the target link.

After receiving the third frame, the receive end device may parse the third frame, and further perform a corresponding operation according to the third frame.

For example, the receive end device is the second MLD. After receiving the third frame, the second MLD is to remove the target link to the first MLD.

For example, the receive end device is a conventional station (that is, a single-link device). When the third frame may reuse an existing frame, the single-link device prepares to perform BSS transition after receiving the third frame.

Optionally, in a case in which the third frame is a newly defined management frame, the first MLD may further send a BTM request frame on the target link, to trigger the conventional station and the MLD that does not receive the third frame to perform BSS transition.

Optionally, the first MLD may further send a fourth frame, where the fourth frame indicates a time at which the target station is to be removed.

For example, the fourth frame may reuse an existing frame. For example, the fourth frame may reuse a beacon frame.

Optionally, in a case in which the fourth frame reuses the beacon frame, a seventh field may be added to the beacon frame, and the seventh field indicates a time at which the target station is to be removed. Specifically, the seventh field indicates a quantity of target beacon transmission times (TBTTs) after which the target station is to be removed. Optionally, the seventh field may be located in a per-STA profile subelement of the target station corresponding to a basic multi-link element carried in the beacon frame. The seventh field may have another name, for example, a delete timer field. This is not limited.

Optionally, the beacon frame may further include an eighth field, and the eighth field indicates whether the beacon frame includes the seventh field. Optionally, the eighth field may be located in a per-STA profile subelement of the target station corresponding to a basic multi-link element carried in the beacon frame. The eighth field may further have another name, for example, a delete timer present field. This is not limited.

According to the embodiment shown in FIG. 18, the first MLD sends the third frame on the target link, to enable another device to learn that the first MLD is to remove the target station.

As shown in FIG. 19, an embodiment of this application provides a multi-link reconfiguration method. The method includes the following steps.

S401: A first MLD sends a fifth frame on a target link in a broadcast manner.

The fifth frame indicates that the first MLD is to remove a target station, and the target station is a station that is affiliated with the first MLD and operates on the target link.

For example, the first MLD includes AP 1, AP 2, and AP 3. AP 1 operates on link 1, AP 2 operates on link 2, and AP 3 operates on link 3. When the first MLD is to remove AP 1, the first MLD sends the fifth frame on link 1 in a broadcast manner. Alternatively, when the first MLD is to remove AP 2, the first MLD sends the fifth frame on link 2 in a broadcast manner. Alternatively, when the first MLD is to remove AP 3, the first MLD sends the fifth frame on link 3 in a broadcast manner.

In a possible design, the fifth frame may reuse an existing frame, to ensure backward compatibility, that is, ensure that a conventional station supporting a protocol of an earlier version can parse the fifth frame. For example, the fifth frame may be a disassociation frame.

It should be understood that, in a case in which the fifth frame reuses the disassociation frame, to enable a receive end device of the disassociation frame to learn that a function of the disassociation frame indicates to remove a current link but not to indicate disassociation, it is necessary to improve the disassociation frame. Optionally, in a case in which the fifth frame is a disassociation frame, that the fifth frame indicates that the first MLD is to remove the current link may be specifically implemented as follows: The disassociation frame includes a field used for multi-link reconfiguration. Optionally, the field used for multi-link reconfiguration does not include information about the target link. The field used for multi-link reconfiguration may have another name, for example, a multi-link reconfiguration variant multi-link element (ML reconfiguration variant ML element). This is not limited. Optionally, for a broadcast disassociation frame, only the current link can be removed. In an implementation, the multi-link reconfiguration variant multi-link element may not include a per-link profile. For a unicast disassociation frame, one or more links can be removed. In an implementation, the multi-link reconfiguration variant multi-link element carries a per-link profile, a link ID, or a link bitmap of a corresponding link to indicate the target link.

Alternatively, that the fifth frame indicates that the first MLD is to remove the current link may be specifically implemented as follows: The fifth frame includes a reason code field, where the reason code field indicates to remove the current link. It should be understood that, compared with a reason code field included in the disassociation frame in a related technology, in this embodiment of this application, a new value is added for the reason code field included in the fifth frame to indicate removal of the current link.

Optionally, when the fifth frame reuses the disassociation frame, the disassociation frame has different functions in different cases. For example, when the disassociation frame includes the field used for multi-link reconfiguration, the disassociation frame is the fifth frame provided in this embodiment of this application, and the MLD that receives the disassociation frame disconnects the current link from the first MLD. In a case in which the disassociation frame does not include the field used for multi-link reconfiguration, the disassociation frame is a disassociation frame defined in an existing standard, and an MLD that receives the disassociation frame is to disassociate from the first MLD.

In another possible design, the fifth frame may be a newly defined management frame, for example, a link removal notify frame, instead of reusing an existing frame. In this way, a function of an existing frame may remain unchanged.

S402: The receive end device receives the fifth frame on the target link.

After receiving the fifth frame, the receive end device may parse the fifth frame, and further perform a corresponding operation according to the fifth frame.

For example, the receive end device is the second MLD. After receiving the fifth frame, the second MLD is to remove the target link to the first MLD. Further, the second MLD and the first MLD do not communicate data on the target link.

For example, the receive end device is a conventional station (that is, a single-link device). When the fifth frame reuses an existing frame, the single-link device may disassociate from the first MLD after receiving the fifth frame.

Optionally, in a case in which the fifth frame is a newly defined management frame, the first MLD may further send a disassociation frame defined in an existing standard on the target link, to disassociate from the conventional station and an MLD that does not receive the fifth frame previously.

Based on the embodiment shown in FIG. 19, the first MLD sends the fifth frame on the target link, to enable another device to learn that the first MLD is to remove the target station.

Optionally, the embodiment shown in FIG. 18 and the embodiment shown in FIG. 19 may be used in combination. As shown in FIG. 20, an embodiment of this application provides a multi-link reconfiguration method. The method includes the following steps.

S501: A first MLD sends a third frame on a target link in a broadcast manner.

S502: A receive end device receives the third frame on the target link.

S503: The first MLD sends a fifth frame on the target link in a broadcast manner.

S504: The receive end device receives the fifth frame on the target link.

According to the embodiment shown in FIG. 20, the first MLD may first send the third frame, so that another device is ready for the first MLD to remove the target station. Then, the first MLD may send the fifth frame to remove the target station.

Currently, multiple stations may be configured for an MLD to support data transmission over multiple links. However, in some cases, the MLD has a requirement for adding a station. For example, when a service volume of the MLD is relatively large, the MLD may add one or more stations affiliated with the MLD, so as to share data transmission load. However, no corresponding solution is provided in the conventional technology.

Figure 21:
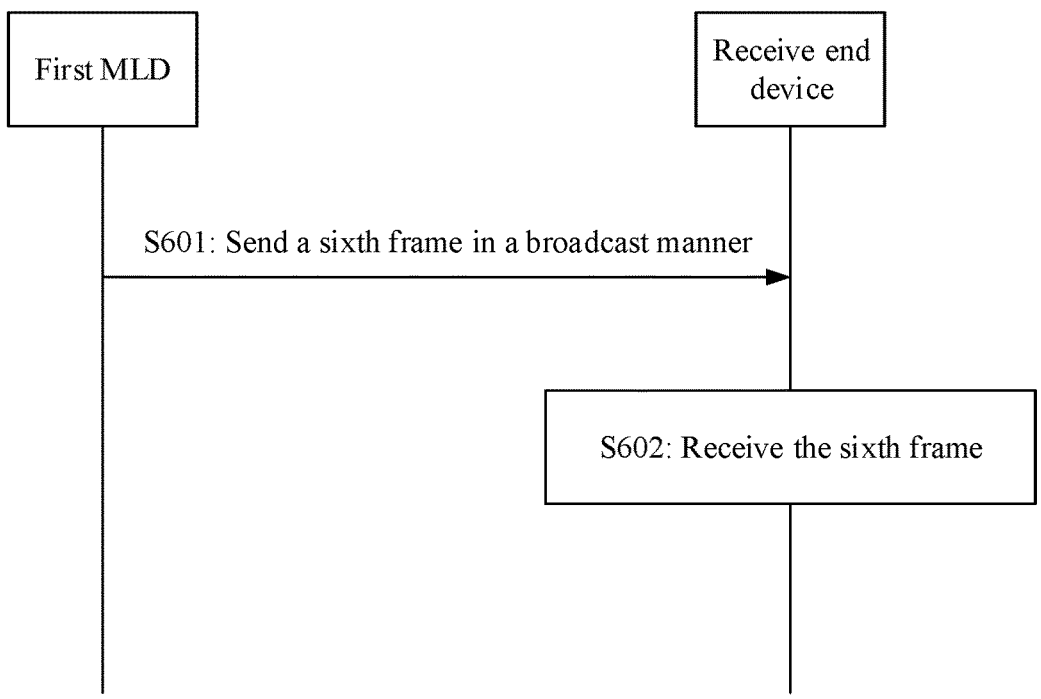
FIG. 21 is a flowchart of another multi-link reconfiguration method according to an embodiment of this application.

In view of this, an embodiment of this application provides a multi-link reconfiguration method. As shown in FIG. 21, the method includes the following steps.

S601: A first MLD sends a sixth frame in a broadcast manner.

The sixth frame is used to indicate the first MLD to add a target station affiliated with the first MLD. The target station operates on a target link.

Optionally, the sixth frame may include information about the target station. For example, the information about the target station includes a BSS operation parameter, BSS capability information, and the like.

Optionally, the sixth frame may reuse an existing frame. For example, the sixth frame may reuse a beacon frame. That the sixth frame includes the information about the target station may be specifically implemented as follows: An ML element or a reduced neighbor report in the beacon frame includes the information about the target station.

In a possible implementation, the first MLD sends the sixth frame in a beacon frame manner on all links supported by the first MLD.

S602: A receive end device receives the sixth frame.

According to the embodiment shown in FIG. 21, the first MLD sends the sixth frame in a broadcast manner, to enable another device to learn that the first MLD is to add the target station. Therefore, the another device may establish a link with the target station of the first MLD for data transmission.

In this embodiment of this application, that the MLD removes a station affiliated with the MLD may also be described as follows: The MLD disables/deactivates the station affiliated with the MLD, or terminates a BSS that the station is in charge. This is not limited.

That the MLD adds a station affiliated with the MLD may also be described as follows: The MLD enables/activates the station affiliated with the MLD, or enables a BSS that the station is in charge. This is not limited.

The solutions provided in embodiments of this application are described above from the perspective of the methods. It may be understood that, to implement the foregoing functions, a communication apparatus includes a corresponding hardware structure and/or software module for performing each function. A person skilled in the art should be easily aware that, in combination with units and algorithm steps of the examples described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the apparatus may be divided into functional modules based on the foregoing method examples. For example, each functional module may be obtained through division based on each corresponding function, or two or more functions may be integrated into one functional module. The integrated module may be implemented in a form of hardware, or may be implemented in a form of a software functional module. In this embodiment of this application, module division is an example, and is merely a logical function division. In actual implementation, another division manner may be used. An example in which each functional module is obtained through division based on each corresponding function is used below for description.

Figure 16:
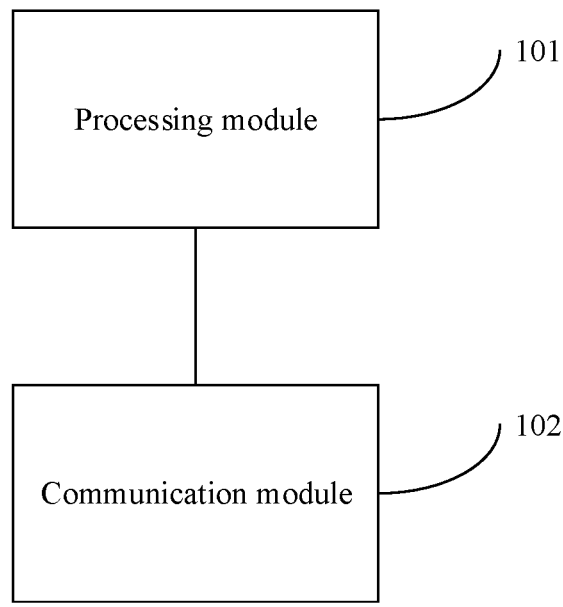
FIG. 16 is a schematic diagram of a structure of a communication apparatus according to an embodiment of this application.

FIG. 16 shows a communication apparatus according to an embodiment of this application. The communication apparatus includes a processing module 101 and a communication module 102.

For example, when the communication apparatus is the first MLD, or the communication apparatus is applied to the first MLD, the processing module 101 is configured to support the first MLD in performing step S101 in FIG. 4. The communication module 102 is configured to support the first MLD in performing step S102 in FIG. 4, step S104 in FIG. 8, steps S201 to S203 in FIG. 14, step S301 in FIG. 18, step S401 in FIG. 19, steps S501 and S503 in FIG. 20, and step S601 in FIG. 21.

For example, when the communication apparatus is the second MLD, or the communication apparatus is applied to the second MLD, the processing module 101 is configured to support the second MLD in performing step S103 in FIG. 4. The communication module 102 is configured to support the second MLD in performing step S102 in FIG. 4, step S104 in FIG. 8, steps S201 to S203 in FIG. 14, step S302 in FIG. 18, step S402 in FIG. 19, steps S502 and S504 in FIG. 20, and step S602 in FIG. 21.

The following describes a possible product form of the communication apparatus. It should be understood that any product in any form that has a feature of the communication apparatus falls within the protection scope of this application. It should be further understood that the following description is merely an example, and does not limit a product form of the communication apparatus in embodiments of this application.

Figure 17:
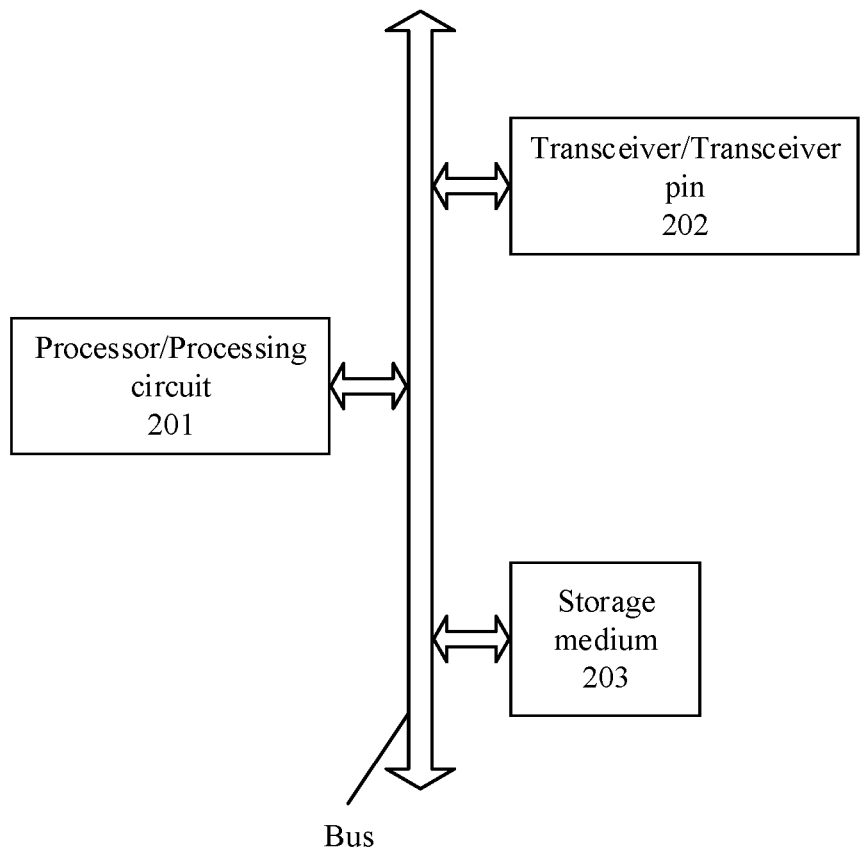
FIG. 17 is a schematic diagram of a structure of a communication apparatus according to an embodiment of this application.

FIG. 17 is a diagram of a structure of a possible product form of a communication apparatus according to an embodiment of this application.

As a possible product form, the communication apparatus in this embodiment of this application may be a multi-link device, and the multi-link device includes a processor 201 and a transceiver 202. Optionally, the multi-link device further includes a memory 203.

For example, when the multi-link device is the first MLD, the processor 201 is configured to support the first MLD in performing step S101 in FIG. 4. The transceiver 202 is configured to support the first MLD in performing step S102 in FIG. 4, step S104 in FIG. 8, steps S201 to S203 in FIG. 14, step S301 in FIG. 18, step S401 in FIG. 19, steps S501 and S503 in FIG. 20, and step S601 in FIG. 21.

For example, when the multi-link device is the second MLD, the processor 201 is configured to support the second MLD in performing step S103 in FIG. 4. The transceiver 202 is configured to support the second MLD in performing step S102 in FIG. 4, step S104 in FIG. 8, steps S201 to S203 in FIG. 14, step S302 in FIG. 18, step S402 in FIG. 19, steps S502 and S504 in FIG. 20, and step S602 in FIG. 21.

As a possible product form, the communication apparatus described in embodiments of this application may be implemented by using a chip. The chip includes a processing circuit 201 and a transceiver pin 202. Optionally, the chip may further include a storage medium 203.

In another possible product form, the communication apparatus described in this embodiment of this application may alternatively be implemented by using the following circuit or component: one or more field programmable gate arrays (FPGA), a programmable logic device (PLD), a controller, a state machine, gate logic, a discrete hardware component, any other suitable circuits, or any combination of circuits that can perform various functions described in this application.

Optionally, an embodiment of this application further provides a computer-readable storage medium. The computer-readable storage medium stores computer instructions. When the computer instructions run on a computer, the computer is enabled to perform the methods in the foregoing method embodiments.

Optionally, an embodiment of this application further provides a computer program product including computer instructions. When the computer instructions run on a computer, the computer is enabled to perform the methods in the foregoing method embodiments.

It should be understood that the computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium, a semiconductor medium (for example, a solid-state drive), or the like.

Based on the foregoing descriptions of the implementations, a person skilled in the art may clearly understand that for the purpose of convenient and brief descriptions, division into the foregoing functional modules is merely used as an example for descriptions. During actual application, the foregoing functions can be allocated to different functional modules for implementation based on a requirement, in other words, an inner structure of an apparatus is divided into different functional modules to implement all or a part of the functions described above.

It should be understood that the apparatus and method disclosed in the several embodiments provided in this application may be implemented in other manners. For example, the described apparatus embodiments are merely examples. For example, the division into modules or units is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in embodiments of this application.

The foregoing descriptions are only specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A multi-link reconfiguration method, wherein the method comprises:
generating, by a first multi-link device (MLD), a basic service set transition management (BTM) request frame, wherein the BTM request frame comprises a first field which occupies only one bit; and wherein the first field indicates a second MLD whether to disconnect only a link on which the BTM request frame is transmitted from the first MLD, or to disassociate from the first MLD, wherein that the second MLD disassociates from the first MLD means that the second MLD disconnects all links from the first MLD; and
sending, by the first MLD, the BTM request frame to the second MLD.

2. The method according to claim 1, wherein the first field equaling 1 indicates the second MLD to disconnect the link on which the BTM request frame is transmitted from the first MLD, and the first field equaling 0 indicates the second MLD to disassociate from the first MLD.

3. The method according to claim 1, wherein the method further comprises:
receiving a BTM response frame, by the first MLD, indicating whether a link transition between the first MLD and the second MLD is accepted.

4. The method according to claim 3, wherein the BTM response frame comprises a target BSSID field, and the target BSSID field comprises a MLD media access control (MAC) address of an AP MLD that the second MLD chooses to establish a connection with.

5. The method according to claim 3, wherein the BTM response frame comprises a neighbor report element, and the neighbor report element comprises a basic multi-link element, and the basic multi-link element doesn't include a per-link profile.

6. An apparatus comprising:
a processor; and a memory coupled to the processor and storing programming instructions for execution by the processor and, when executed causing the apparatus to perform operations comprising:
generating a basic service set transition management (BTM) request frame for sending to a second multi-link device (MLD), wherein the BTM request frame comprises a first field which occupies only one bit; and wherein the first field indicates the second MLD whether to disconnect only a link on which the BTM request frame is transmitted from a first MLD, or to disassociate from the first MLD, wherein that the second MLD disassociates from the first MLD means that the second MLD disconnects all links from the first MLD.

7. A non-transitory computer-readable storage medium, wherein the computer-readable storage medium stores a computer program, the computer program comprises program instructions; and when the program instructions are executed by a first multi-link device (MLD), the first MLD is enabled to perform:
generating a basic service set transition management (BTM) request frame, wherein the BTM request frame comprises a first field which occupies only one bit; and wherein the first field indicates a second MLD whether to disconnect only a link on which the BTM request frame is transmitted from the first MLD, or to disassociate from the first MLD, wherein that the second MLD disassociates from the first MLD means that the second MLD disconnects all links from the first MLD; and
sending the BTM request frame to the second MLD.

8. The apparatus according to claim 6, wherein the first field equaling 1 to disconnect the link on which the BTM request frame is transmitted from the first MLD, and the first field equaling 0 to disassociate from the first MLD.

9. The apparatus according to claim 6, wherein when the instructions are executed by the processor the apparatus further performs:

receiving a BTM response frame, wherein the BTM response frame indicates whether a link transition between the first MLD and the second MLD is accepted.

10. The apparatus according to claim 9, wherein the BTM response frame comprises a target BSSID field, and the target BSSID field comprises an MLD media access control (MAC) address of an AP MLD that the second MLD chooses to establish a connection with.

11. The apparatus according to claim 9, wherein the BTM response frame comprises a neighbor report element, and the neighbor report element comprises a basic multi-link element, and the basic multi-link element doesn't include a per-link profile.

12. The non-transitory computer-readable storage medium according to claim 7, wherein when the instructions are executed by the first MLD the first MLD is enabled to further perform:
receiving a BTM response frame, wherein the BTM response frame indicates whether a link transition between the first MLD and the second MLD is accepted.

13. The non-transitory computer-readable storage medium according to claim 12, wherein the BTM response frame comprises a target BSSID field, and the target BSSID field comprises an MLD media access control (MAC) address of an AP MLD that the second MLD chooses to establish a connection with.

14. The non-transitory computer-readable storage medium according to claim 12, wherein the BTM response frame comprises a neighbor report element, and the neighbor report element comprises a basic multi-link element, and the basic multi-link element doesn't include a per-link profile.

15. The non-transitory computer-readable storage medium according to claim 7, wherein the first field equaling 1 to disconnect the link on which the BTM request frame is transmitted from the first MLD, and the first field equaling 0 to disassociate from the first MLD.

* * * * *